(12) United States Patent
Ohori et al.

(10) Patent No.: US 11,308,296 B2
(45) Date of Patent: Apr. 19, 2022

(54) OPTICAL INFORMATION READING DEVICE AND OPTICAL INFORMATION READING METHOD

(71) Applicant: Keyence Corporation, Osaka (JP)

(72) Inventors: Hiroomi Ohori, Osaka (JP); Tomomi Izaki, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 84 days.

(21) Appl. No.: 16/817,889

(22) Filed: Mar. 13, 2020

(65) Prior Publication Data
US 2020/0327290 A1 Oct. 15, 2020

(30) Foreign Application Priority Data

Apr. 15, 2019 (JP) ............................. JP2019-077442

(51) Int. Cl.
*G06K 7/10* (2006.01)
*G06K 7/14* (2006.01)
*G06K 7/08* (2006.01)

(52) U.S. Cl.
CPC .......... *G06K 7/10811* (2013.01); *G06K 7/089* (2013.01); *G06K 7/1095* (2013.01); *G06K 7/10861* (2013.01); *G06K 7/1486* (2013.01)

(58) Field of Classification Search
CPC .............. G06K 7/10811; G06K 7/089; G06K 7/10861; G06K 7/1095; G06K 7/1486; G06K 7/10752; G06K 7/10584

USPC ............ 235/472.01, 472.02, 472.03, 462.44, 235/462.45, 462.46, 462.48, 462.42, 235/462.2, 462.21, 462.11, 455
See application file for complete search history.

(56) References Cited

U.S. PATENT DOCUMENTS

| | | | | |
|---|---|---|---|---|
| 5,710,417 A | * | 1/1998 | Joseph ............... | G06K 7/10584 235/462.11 |
| 6,340,114 B1 | * | 1/2002 | Correa ............... | G06K 7/10722 235/462.01 |
| 6,478,226 B2 | * | 11/2002 | Canini ............... | G06K 7/10881 235/454 |
| 6,708,883 B2 | * | 3/2004 | Krichever .......... | G06K 7/10811 235/455 |

(Continued)

FOREIGN PATENT DOCUMENTS

JP 11312210 A 11/1999

*Primary Examiner* — Christle I Marshall
(74) *Attorney, Agent, or Firm* — Kilyk & Bowersox, P.L.L.C.

(57) ABSTRACT

An optical information reading device 100 includes an aiming module 60 configured to irradiate aiming light for instructing an imaging area of image data generated by an imaging module, a trigger switch 30 for starting imaging processing by the imaging module, an aiming switch 43B for causing the aiming module 60 to irradiate the aiming light, and a reading unit 81 configured to read information of the symbol. The reading unit 81 is configured to, in an aiming state in which irradiation processing for the aiming light by the aiming module 60 is executed by operation of the aiming switch 43B, detect that the trigger switch 30 is operated and read, based on the image data generated by the imaging processing of the imaging module, information of the symbol included in a predetermined partial area PA corresponding to an irradiation position of the aiming light.

13 Claims, 14 Drawing Sheets

(56) References Cited

U.S. PATENT DOCUMENTS

| | | | | |
|---|---|---|---|---|
| 7,428,991 B2* | 9/2008 | Joseph | ............... | G06K 7/10732 235/440 |
| 7,497,382 B2* | 3/2009 | Mitelman | ........... | G06K 7/10851 235/454 |
| 7,637,430 B2* | 12/2009 | Hawley | .............. | G06K 7/10851 235/454 |
| 9,111,163 B2* | 8/2015 | He | ........................ | G06K 7/1443 |
| 2007/0057067 A1* | 3/2007 | He | .................... | G06K 7/10851 235/462.45 |
| 2009/0084847 A1* | 4/2009 | He | .................... | G06K 7/10752 235/455 |
| 2013/0026235 A1* | 1/2013 | Gurevich | ........... | G06K 7/10633 235/462.21 |

* cited by examiner

OPTICAL INFORMATION READING DEVICE AND OPTICAL INFORMATION READING METHOD

CROSS-REFERENCE TO RELATED APPLICATIONS

The present application claims foreign priority based on Japanese Patent Application No. 2019-077442, filed Apr. 15, 2019, the contents of which are incorporated herein by reference.

BACKGROUND OF THE INVENTION

1. Field of the Invention

The present invention relates to an optical information reading device and an optical information reading method.

2. Description of Related Art

There has been known a hand-held (handy-type) optical information reading device that receives light from a reading target symbol (QR code or the like), acquires image data of the symbol with an image sensor, and analyzes the image data to read information corresponding to the symbol (for example, JP-A-11-312210).

Such an optical information reading device performs decoding of the symbol included in an image captured by the image sensor in a predetermined imaging visual field.

It is assumed that, in a situation in which a plurality of symbols are closely gathered, for example, cardboard boxes attached with symbols SB are stacked as shown in FIG. 15, a user desires to read, with an optical information reading device HT, only information corresponding to a specific symbol among the plurality of symbols. In this case, if the plurality of symbols are included in an imaging visual field as indicated by alternate long and short dash lines in FIG. 15, it is conceivable that a symbol different from an intended symbol is read. In order to prevent this problem, it is conceivable to change imaging setting to narrow the imaging visual field in advance to prevent unnecessary symbols from being included in an image captured by an image sensor as indicated by broken lines in FIG. 15.

However, when the imaging visual field is set narrow in this way, even in a state which only one symbol SB is present as shown in FIG. 16, the posture of the optical information reading device HT has to be accurately adjusted to target the symbol SB every time and, therefore, convenience of use is deteriorated. Therefore, it is necessary to change the imaging setting again to widen a reading range, in other works, return the imaging visual field to the original wide visual field.

Whereas such work for changing the imaging setting needs to be performed from a setting screen of the optical information reading device, if work for switching the setting is necessary, the work is extremely complicated and time-consuming.

SUMMARY OF THE INVENTION

An object of the present invention is to provide an optical information reading device and an optical information reading method that make it possible to easily change a reading range.

An optical information reading device according to a first aspect of the present invention is an optical information reading device including: an imaging module configured to convert reflected light from a reading target symbol into an electric signal and generate image data; an aiming module configured to irradiate aiming light for instructing an imaging area of the image data generated by the imaging module; a trigger switch for starting imaging processing by the imaging module; an aiming switch for causing the aiming module to irradiate the aiming light; and a reading unit configured to read information of the symbol based on the image data generated by the imaging processing of the imaging module. The reading unit can be configured to, in an aiming state in which irradiation processing for the aiming light by the aiming module is executed by operation of the aiming switch, detect that the trigger switch is operated and read, based on the image data generated by the imaging processing of the imaging module, information of the symbol included in a predetermined partial area corresponding to an irradiation position of the aiming light. With the configuration explained above, when it is desired to read a specific symbol, the reading can be executed by associating the irradiation position of the aiming light with the specific symbol in the aiming state. It is possible to make it unnecessary to perform work for switching the imaging visual field from the wide visual field to the narrow visual field in advance and work for returning the narrow visual field to the original wide visual field after reading the specific symbol as in the past. Therefore, it is possible to improve convenience of use.

According to a second aspect of the present invention, in the optical information reading device, in addition to the configuration explained above, the reading unit can be configured to, in the aiming state, read the information of the symbol included in the predetermined partial area including the irradiation position of the aiming light.

Further, according to a third aspect of the present invention, in the optical information reading device, in addition to one of the configurations explained above, the reading unit can be configured to, in the aiming state, read the information of the symbol when the irradiation position of the aiming light overlaps a part of the symbol.

Furthermore, according to a fourth aspect of the present invention, in the optical information reading device, in addition to any one of the configurations explained above, the reading unit can be configured to, in a non-aiming state in which the irradiation processing for the aiming light is not executed, detect that the trigger switch is operated and read, based on the image data generated by the imaging processing of the imaging module, the information of the symbol included in an entire area corresponding to an entire imaging visual field of the imaging module.

Furthermore, according to a fifth aspect of the present invention, in the optical information reading device, in addition to any one of the configurations explained above, the reading unit can be configured to, in the aiming state, detect that the trigger switch is operated and output only the information of the symbol included in the predetermined partial area in the information of the symbol included in an entire area corresponding to an entire imaging visual field of the imaging module.

Furthermore, according to a sixth aspect of the present invention, in the optical information reading device, in addition to any one of the configurations explained above, the reading unit can be configured to detect that the trigger switch is operated and alternately or continuously execute the imaging processing for an entire imaging visual field imaged by the imaging module and the irradiation processing for the aiming light by the aiming module.

Furthermore, according to a seventh aspect of the present invention, in the optical information reading device, in addition to any one of the configurations explained above, the reading unit can be configured to, in the aiming state, detect that the trigger switch is operated and alternately or continuously execute the imaging processing for the predetermined partial area and the irradiation processing for the aiming light by the aiming module. With the configuration explained above, there is an advantage that an increase in speed of processing can be expected by limiting an area where the reading processing by the reading unit is performed.

Furthermore, according to an eighth aspect of the present invention, in the optical information reading device, in addition to any one of the configurations explained above, the optical information reading device can further include a reading-mode switching unit configured to switch a regular center reading mode for, in both of the aiming state and the non-aiming state, detecting that the trigger switch is operated and reading the information of the symbol included in the predetermined partial area corresponding to the irradiation position of the aiming light, a regular normal reading mode for, in both of the aiming state and the non-aiming state, detecting that the trigger switch is operated and reading the information of the symbol included in an entire area corresponding to an entire imaging visual field of the imaging module, and a selective center reading mode for, in the aiming state, detecting that the trigger switch is operated and reading the information of the symbol included in the predetermined partial area corresponding to the irradiation position of the aiming light and, in the non-aiming state, detecting that the trigger switch is operated and reading the information of the symbol included in the entire area corresponding to the entire imaging visual field of the imaging module. With the configuration explained above, it is possible to switch, besides the selective center reading mode, the regular center reading mode and the regular normal reading mode according to a use.

Furthermore, according to a ninth aspect of the present invention, in the optical information reading device, in addition to any one of the configurations explained above, the optical information reading device can further include: a display module including a rectangular display surface extended in one direction and including, as end edges along a longitudinal direction of the display surface, a first end edge for performing imaging and a second end edge on an opposite side of the first end edge; and a grip part ranging from an inclined surface inclined from the display surface on the second end edge side of the display module, the grip part being inclined and extended in a direction away from the display surface in the longitudinal direction of the display surface. The aiming switch can be disposed on the inclined surface between the display module and the grip part. With the configuration explained above, a user is capable of holding the grip part with one hand and operating the trigger switch while keeping pressing the aiming switch and does not need to operate the trigger switch with both hands. Therefore, convenience of use is improved.

Furthermore, according to a tenth aspect of the present invention, in the optical information reading device, in addition to any one of the configurations explained above, the trigger switch and the aiming switch can be configured by a common switch. The trigger switch can be operated as the aiming switch according to a time of ON/OFF of the trigger switch. With the configuration explained above, there is an advantage that the number of components can be reduced and the configuration of the optical information recording device can be simplified.

Furthermore, an optical information reading method according to an eleventh aspect of the present invention is an optical information reading method using an optical information reading device that images a reading target symbol and reads the symbol, the optical information reading method including: irradiating, on the reading target symbol, from an aiming module, aiming light for instructing an imaging area of image data generated by an imaging module by converting reflected light from the symbol into an electric signal; and operating, in an aiming state in which irradiation processing for the aiming light by the aiming module is executed, a trigger switch for instructing a start of imaging processing by the imaging module, executing the imaging processing of the imaging module and generating image data, and reading, based on the image data, information of the symbol included in a predetermined partial area corresponding to an irradiation position of the aiming light. Consequently, when it is desired to read a specific symbol, the reading can be executed by associating the irradiation position of the aiming light with the specific symbol in the aiming state. It is possible to make it unnecessary to perform work for switching the imaging visual field from the wide visual field to the narrow visual field in advance and work for returning the narrow visual field to the original wide visual field after reading the specific symbol as in the past. Therefore, it is possible to improve convenience of use.

Furthermore, according to a twelfth aspect of the present invention, in the optical information reading method, in addition to the above description, in the reading the information of the symbol, the trigger switch can be operated while the aiming switch is kept operated. Consequently, it is possible to easily perform operation for executing the reading of the symbol only in the predetermined partial area.

Furthermore, according to a thirteenth aspect of the present invention, in the optical information reading method, according to one of the above descriptions, in the reading the information of the symbol, in a non-aiming state in which the irradiation processing for the aiming light is not executed, the information of the symbol included in an entire area corresponding to an entire imaging visual field of the imaging module can be read based on the image data generated by the imaging processing of the imaging module by operating the trigger switch.

DESCRIPTION OF EMBODIMENTS

Figure 1:
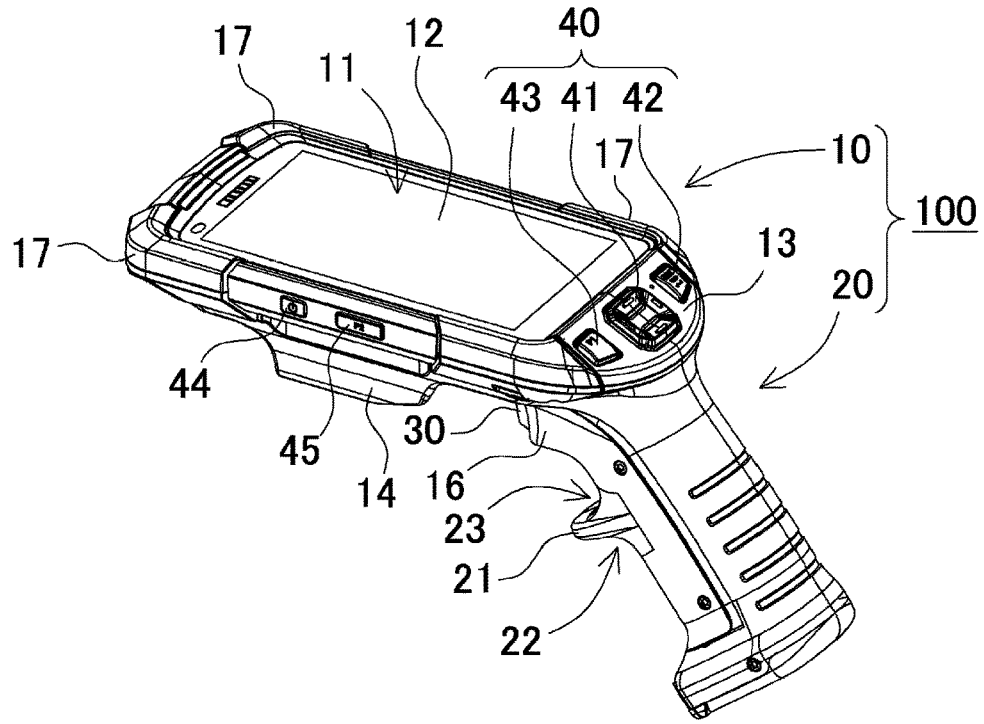
FIG. 1 is a perspective view of an optical information reading device according to a first embodiment viewed from rearward and obliquely above.

Embodiments of the present invention are explained below with reference to the drawings. However, the embodiments explained below illustrates an optical information reading device and an optical information reading method for embodying the technical idea of the present invention. The present invention does not limit the optical information reading device and the optical information reading method to those explained below. This specification does not limit members described in claims to members in the embodiments. In particular, dimensions, materials, shapes, relative disposition, and the like of components described in the embodiments are not meant to limit the scope of the present invention only to the dimensions, the materials, the shapes, and the relative dispositions, and the like unless specifically described otherwise and are mere explanation examples. Note that sizes, positional relations, and the like of members shown in the drawings are sometimes exaggerated in order to clarify explanation. Further, in the following explanation, the same names and sings indicate the same or homogenous members. Detailed explanation of the members is omitted as appropriate. Further, as elements configuring the present invention, a plurality of elements may be configured by the same member and one member may use the plurality of elements in common. Conversely, a function of one member can also be shared and realized by a plurality of members.

First Embodiment

Figure 2:
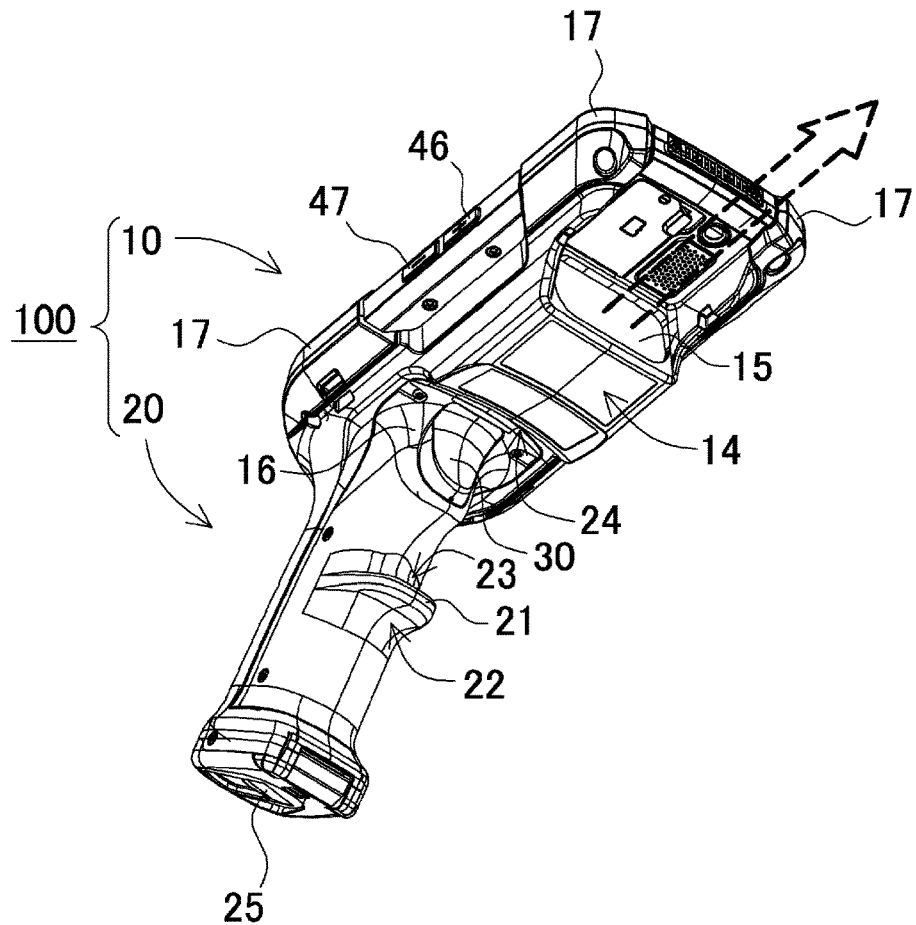
FIG. 2 is a perspective view of the optical information reading device shown in FIG. 1 viewed from forward and obliquely below.
Figure 3:
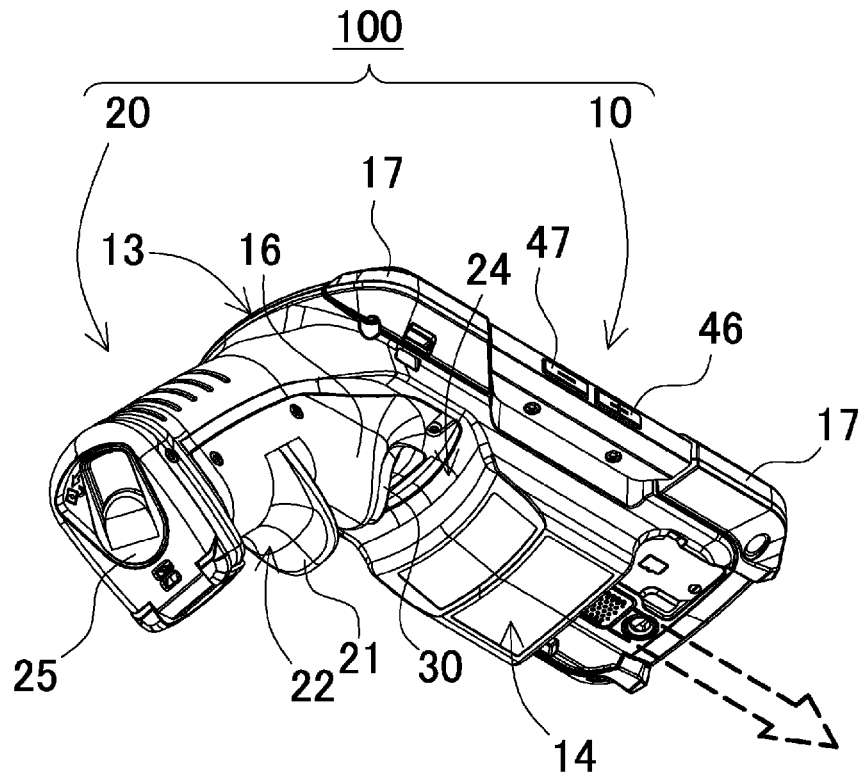
FIG. 3 is a perspective view of the optical information reading device shown in FIG. 1 viewed from rearward and obliquely below.
Figure 4:
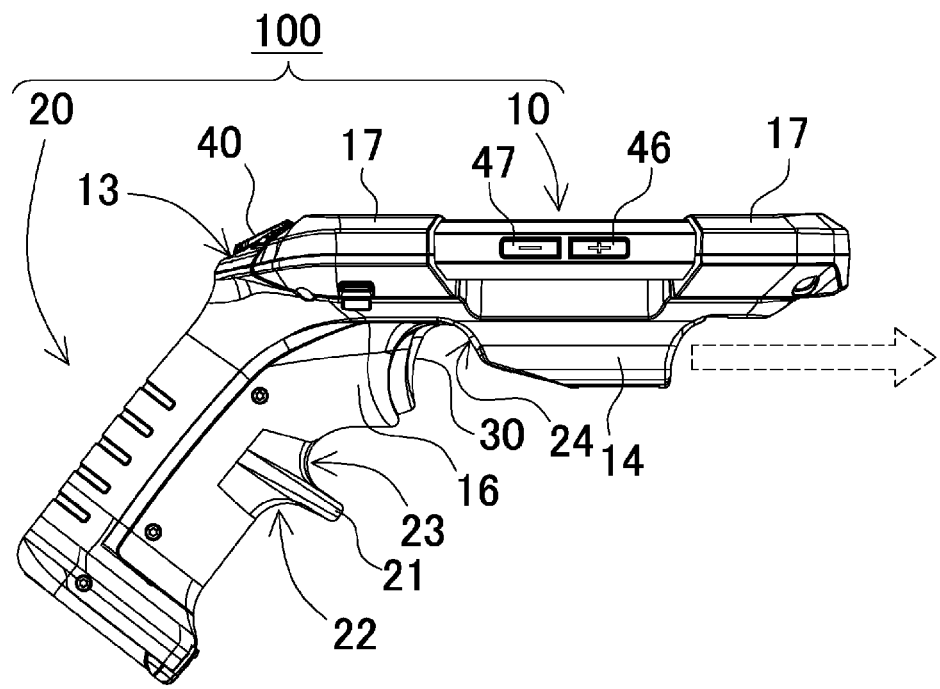
FIG. 4 is a right side view of the optical information reading device shown in FIG. 1.
Figure 5:
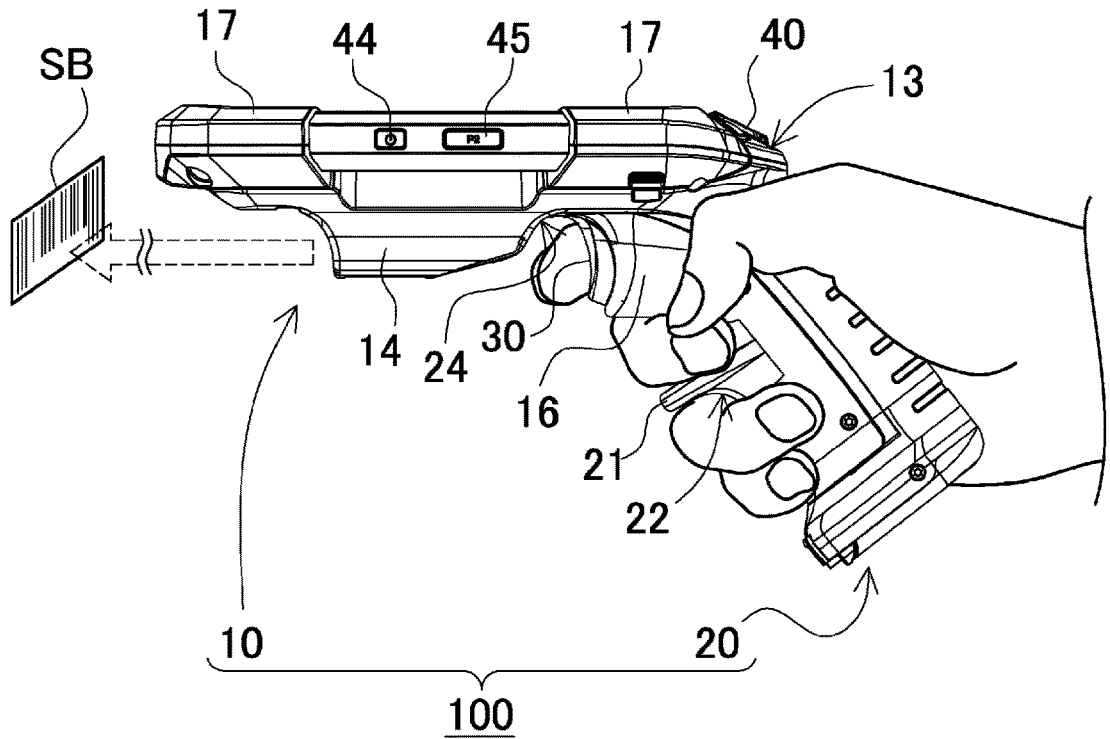
FIG. 5 is a left side view of the optical information reading device shown in FIG. 1.
Figure 6:
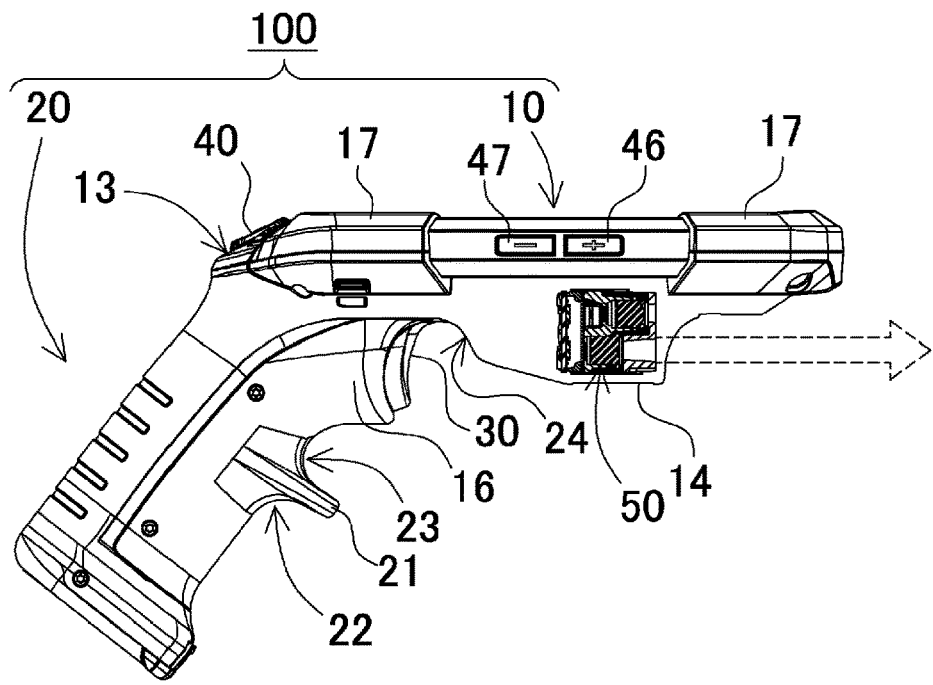
FIG. 6 is a partial sectional view showing an imaging module shown in FIG. 4.

An optical information reading device is a member that reads a symbol such as a barcode or a two-dimensional code and performs registration and collation of data. The optical information reading device is also called handy scanner, handy terminal, PDA for business use, and the like. An optical information reading device 100 according to a first embodiment of the present invention is shown in FIGS. 1 to 6. In these figures, FIG. 1 is a perspective view of the optical information reading device 100 according to the first embodiment viewed from rearward and obliquely above. FIG. 2 is a perspective view of the optical information reading device 100 shown in FIG. 1 viewed from forward and obliquely below. FIG. 3 is a perspective view of the optical information reading device 100 shown in FIG. 1 viewed from rearward and obliquely below. FIG. 4 is a right side view of the optical information reading device 100 shown in FIG. 1. FIG. 5 is a left side view of the optical information reading device 100 shown in FIG. 1. FIG. 6 is a partial sectional view showing an imaging module 50 shown in FIG. 4.

The optical information reading device 100 shown in these figures includes a main body part 10 provided with a display module 11 on the upper surface and a grip part 20 obliquely extended from the rear end of the main body part 10. The grip part 20 includes a trigger switch 30. A user grips the grip part 20 and operates the trigger switch 30 with a finger to thereby cause the optical information reading device 100 to execute processing such as reading of a symbol. FIG. 5 shows a state in which the user grips the grip part 20 with the right hand and places the index finger on the trigger switch 30. In this state, the user holds the optical information reading device 100 in a posture facing a symbol SB and pulls the trigger switch 30 to perform reading. The optical information reading device 100 can irradiate aiming light for instructing an imaging position of the imaging module with a laser, an LED, or the like in order to indicate a readable range to the user. Therefore, the optical information reading device 100 includes an aiming module 60 that irradiates the aiming light. Further, the optical information reading device 100 includes a reading unit 81 that reads, based on image data of a symbol imaged by the imaging module 50, information of the symbol.

Main Body Part 10

The upper surface of the main body part 10 is a flat surface. A display module 11 is provided on the upper surface. The display module 11 includes a rectangular display surface 12 extended in one direction. The display surface 12 is a surface for displaying read information, setting information, and the like. The display surface 12 is a surface on which display by the display module 11 configured by a liquid-crystal, display, an organic EL display, or the like is performed. The display surface 12 can be a touch panel. The main body part 10 including the display module 11 includes, as end edges along the longitudinal direction of the display surface 12, a first end edge for performing imaging and a second end edge on the opposite side of the first end edge. The first end edge is located on the front end side of the main body part 10, that is, a surface side for performing reading of a symbol. The second end edge is located on the rear end side of the main body part 10.

An inclined surface 13 inclined from the display surface 12 toward the grip part 20 side is provided at the second end edge. Various operation keys 40 for the user to operate with a finger are disposed on the inclined surface 13. The user operates the operation keys 40 to execute various kinds of operation for display content on the display surface 12 and perform various kinds of processing such as irradiation of illumination light and aiming light, reading, and capturing of an image.

The illumination light is light for illuminating a reading target symbol such as a two-dimensional code. The illumination light is irradiated from the aiming module 60. The aiming light is light indicating a reading position of the optical information reading device 100. The aiming light is irradiated from the aiming module 60. By forming the aiming light as a pattern such as a dot, a cross, or a line indicated by a semiconductor laser or the like, it is possible to indicate a reading area to the user based on the pattern of such aiming light. Preferably, by including a horizontal line in the pattern of the aiming light, it is easy to cause the user to image a scanning line for performing barcode scan and visually grasp a purpose of the barcode scan. By forming the aiming light in a cross shape formed by crossing a vertical line in the center of the horizontal line, it is easy to grasp the position of the center. If the aiming light formed in the cross pattern is formed in, for example, a laterally long cross shape long in the horizontal line and short in the vertical line, it is easy to cause the user to image a laterally long barcode.

Operation Keys 40

In an example shown in FIG. 1 and the like, as the operation keys 40, a cross key 41 is provided in the center of the inclined surface 13, an enter key 42 is provided on the right side of the cross key 41, and a first function key 43 is provided on the left side of the cross key 41. The cross key 41 is a key switch for performing operation for indicating directivity on the display surface 12. The enter key 42 is a key switch for performing determination operation related to display content on the display surface 12 of the display module 11. By disposing the operation keys 40 on the inclined surface in this way, the operation keys 40 can be visually recognized either from the upper surface side or the rear surface side of the optical information reading device 100 and can be operated. In addition, the user can operate the operation keys 40 provided on the inclined surface 13 with the thumb of the hand holding the grip part 20. The user is capable of operating the operation keys 40 while gripping the optical information reading device 100 with one hand.

Further, various keys are also provided on side surfaces of the main body part 10. In this example, as shown in FIGS. 1 and 5, a power key 44 and a second function key 45 are provided on the left side surface of the main body part 10 when viewed from the user side in a state in which the user grips the optical information reading device 100. As shown in FIGS. 2, 3, and 4, a + key 46 and a − key 47 are provided on the right side surface of the main body part 10. The + key 46 and the − key 47 can be used for an increase and a reduction of numerical values of volume and the like and can be used as, in combination with other keys, short-cut keys for executing specific functions.

Note that the optical information reading device 100 shown in FIG. 1 and the like does not include a physical ten key. A ten key is realized by displaying a software keyboard on the display surface 12. Consequently, it is possible to save a space for arranging the physical ten key on the display surface 12 and secure a wide area for the display on the display surface 12.

Housing Section 14

Further, a housing section 14 is offset to a depth position from the first end edge of the front end surface and projected from the lower surface of the main body part 10. As shown in FIG. 6, the imaging module 50 is housed in the housing section 14.

Imaging Module 50

The imaging module 50 is disposed on the surface side opposite to the display surface 12 of the display module 11. The imaging module 50 images a symbol with an imaging optical axis parallel to the display surface 12. Accordingly, the imaging module 50 includes an imaging element that images the symbol. A plurality of imaging elements may be provided. The plurality of imaging elements can be respectively coupled to fixed-focus optical systems having different focal lengths.

The imaging module 50 may include the aiming module 60 and an illumination module 70. A translucent cover 15 is provided on the front surface of the housing section 14 as shown in FIG. 2. As indicated by a broken line arrow in FIG. 2, aiming light and illumination light are respectively emitted from the aiming module 60 and the illumination module 70 through the translucent cover 15.

The imaging module 50 is preferably disposed in a position overlapping the display surface 12 in a plan view of the display surface 12. The imaging module 50 is preferably disposed further on the inclined surface 13 side than the end face on the opposite side of the inclined surface 13 of the display module 11 in the longitudinal direction of the display surface 12 in the plan view of the display surface 12. Consequently, even when reading is performed at a relatively short distance (for example, 20 cm or less) from a housing, there is an advantage that the reading is easy because a wide visual field is obtained. Balance of weight can be located on an operation surface side. Consequently, it is possible to reduce feeling of weight when the user holds the optical information reading device 100.

Aiming Module 60

The aiming module 60 irradiates aiming light for instructing an imaging area of the imaging module 50.

An aiming switch for causing the aiming module 60 to irradiate the aiming light is provided in the optical information reading device 100. Like the operation keys 40, the aiming switch is disposed on the inclined surface 13. The operation keys 40 and the aiming switch are disposed on the same plane.

An exclusive key switch may be provided as the aiming switch or the aiming switch may be used concurrently as another key switch. For example, a function of an aiming switch 43B may be allocated to a key switch configuring the operation keys 40. As an example, the function of the aiming switch 43B is allocated to the first function key 43 shown in FIG. 1 and the like (the left of the cross key 41 in FIG. 1 and the like). Consequently, it is possible to reduce the number of physical key switches and simplify the configuration of the optical information reading device 100.

The main body part 10 includes the reading unit 81. The reading unit 81 reads, based on image data of a symbol imaged by the imaging module 50, information of the symbol.

Further, the optical information reading device 100 includes the grip part 20 ranging from the inclined surface 13 of the main body part 10 and inclined and extended in a direction away from the display surface 12 in the longitudinal direction of the display surface 12 and the trigger switch 30 for starting imaging processing of the imaging module 50. The trigger switch 30 is provided in an area where the grip part 20 faces the rear surface side of the display module 11. In an example shown in FIGS. 2, 4, and 5, the trigger switch 30 is provided in an upper part of the grip part 20. Specifically, a trigger supporting member 16 that linearly movably supporting the trigger switch 30 is formed in the upper part of the grip part 20. The trigger supporting member 16 holds the trigger switch 30 such that a moving direction of the trigger switch 30 is substantially parallel to the display surface 12 of the display module 11.

Grip Part 20

The grip part 20 is extended in an oblique direction from the end face on the rear end side of the main body part 10, that is, the near side in a posture in which the user grips the grip part 20. By obliquely inclining the grip part 20, the user can easily grip the grip part 20 with a hand. The grip part 20 is extended to be connected to the inclined surface 13 provided on the rear end side of the main body part 10. In particular, the inclined surface 13 is inclined from the upper surface of the display module 11 and the grip part is further inclined from the inclined surface 13. Consequently, the rear end side of the main body part 10 is smoothly bent. The optical information reading device 100 can be easily handled.

In addition, since the grip part 20 is provided on the rear end side of the main body part 10, the main body part 10 includes no portion projecting to the rear end side. For example, as in an optical information reading device 700 according to a comparative example shown in FIG. 7, in a configuration in which a grip part 720 is offset from the rear end of a main body part 710, there is a portion X projecting from the rear of the grip part 720. Therefore, when the optical information reading device 700 is carried, even if a user stores the optical information reading device 700 in a holder or a case hung from the waist, the rear end projecting portion X always projects and is sometimes obstructive. As a result, there is a concern that the optical information reading device 700 cannot be stored in the holder or the like and causes a failure.

Figure 7:
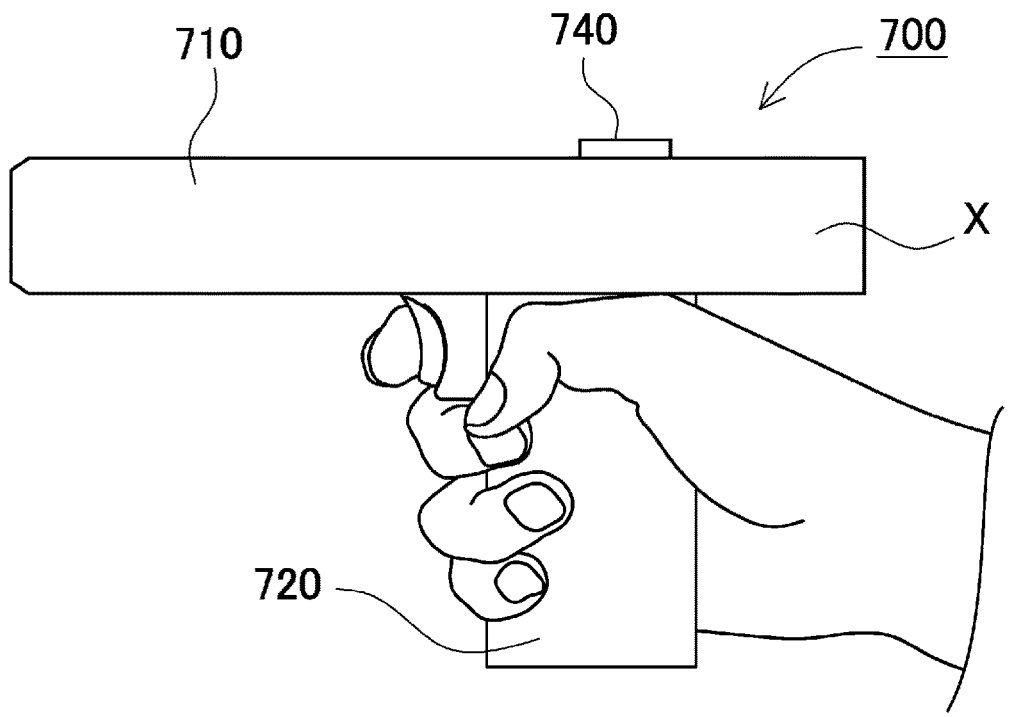
FIG. 7 is a side view showing an optical information reading device according to a comparative example.

In the configuration shown in FIG. 7, even if the user is about to operate an operation key 740 provided at the rear end of the main body part 710 with the thumb of the hand gripping the grip part 720, the thumb cannot reach the operation key 740 while being obstructed by the rear end projecting portion X. Accordingly, the user needs to operate the operation key 740 with the hand not holding the grip part 720. When the hand not holding the grip part 720 holds baggage, the user has to once put down the baggage and operate the operation key 740. Therefore, it is likely that work takes time or the baggage is broken when the baggage is put down.

On the other hand, in the configuration excluding the projecting portion as shown in FIG. 5, since the grip part 20 and the rear end of the display surface 12 are connected, the user can operate the operation keys 40 with the thumb of the hand holding the grip part 20. In particular, to enable the user to operate the operation keys 40 with the thumb usable even when the user grips the grip part 20 of the optical information reading device 100 with one hand, the operation keys 40 are located on the rear end side of the display module where the thumb is located, the surface on which the operation keys 40 are provided is formed as the inclined surface 13, and the grip part 20 is inclined rather than being orthogonal to the display surface 12. Since such a configuration is adopted, in a state in which the user grips the grip part 20 with fingers other than the thumb, the operation keys 40 are disposed in a position easily accessed by the thumb. In addition, not only the operation keys 40 but also the touch panel on the display surface 12 can be operated. As a result, the user can operate the optical information reading device 100 with the thumb while gripping the optical information reading device 100 with one hand. That is, the user can grip the optical information reading device 100 with one hand and read a reading target and perform necessary operation with the thumb while holding the reading target with the other hand. In other hands, while, when the user needs to perform work with both the hands, the user has to once put down the baggage such that the user can use both the hands, since operation is completed by one hand, such labor and time is eliminated. The optical information reading device 100 is extremely convenient for use and efficient work is realized.

Gripping Projection Piece 21

On the other hand, in the configuration shown in FIG. 7, since the rear end projecting portion X is present, the bottom surface of the projecting portion can be supported by the back of the hand. That is, by partially supporting the main body part 10 in an area between the thumb and the index finger, it is possible to disperse the load of the optical information reading device 700.

Figure 8:
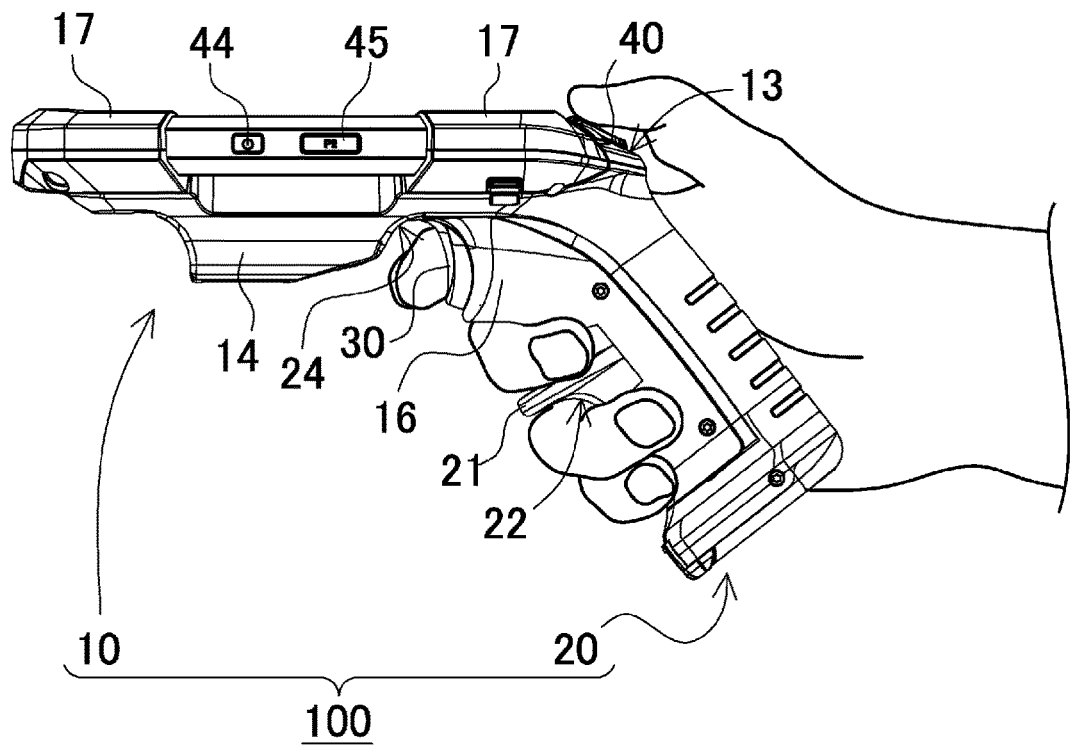
FIG. 8 is a left side view showing a state in which an operation key of the optical information reading device shown in FIG. 5 is operated by a thumb.
Figure 9:
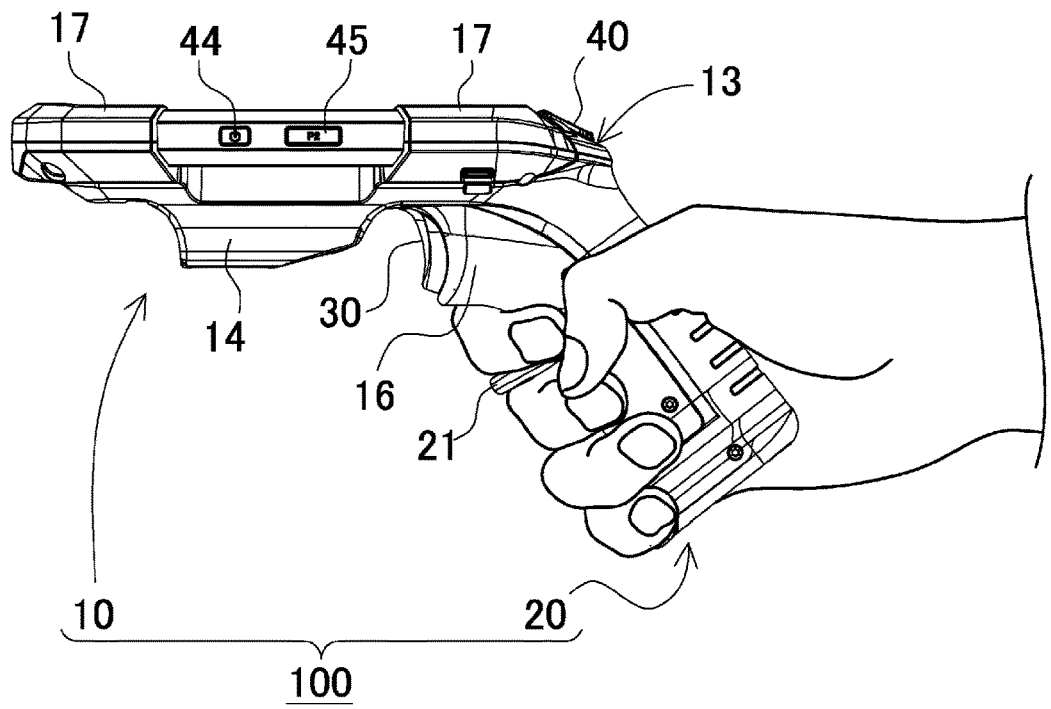
FIG. 9 is a side view showing a state in which upper and lower parts of a gripping projection piece are held by fingers.

On the other hand, in the optical information reading device 100 according to the first embodiment shown in FIGS. 5 and 8 and the like, since the rear end projecting portion X is eliminated, the user cannot support the optical information reading device 100 using the back of the hand. As a result, the user holds the optical information reading device 100 with only grasping power for gripping the grip part 20 and a load increases. Therefore, as shown in FIG. 5, in the middle in an extending direction of the grip part 20, the gripping projection piece 21 projecting in a direction orthogonal to the extending direction is provided. Consequently, when the user grips the grip part 20, the user can support the lower surface of the gripping projection piece 21 with a finger. A fulcrum for supporting the optical information reading device 100 is added other than the grasping force for gripping the grip part 20. The load for supporting the optical information reading device 100 can be dispersed. Stability of the holding is improved. By holding, with fingers, the upper and lower surfaces of the gripping projection piece 21 projected as shown in FIG. 9, it is possible to pinch the gripping projection piece 21 between the fingers and more stably hold the gripping projection piece 21. In an example shown in FIG. 8, a state in which the gripping projection piece 21 is held by the middle finger and the third finger of the right hand of the user is shown. Consequently, sure holding is achieved and handling of the optical information reading device 100 via the grip part 20 is improved. Naturally, fingers that hold the gripping projection piece 21 are not limited to the middle finger and the third finger of the user. Any fingers adjacent to each other such as a combination of the third finger and the little finger can be used. It goes without saying that the user can grip the grip part 20 with not only the right hand but also the left hand.

First Recess 22

A first recess 22 having a curved surface shape is preferably formed on the lower surface of the gripping projection piece 21. Consequently, a finger is easily placed on the lower surface of the gripping projection piece 21. Since the surface in contact with the finger is formed as a curved surface, the gripping projection piece 21 easily fits the finger when being gripped. It is possible to increase a contact area and reduce pressure. In other words, when the first recess 22 is formed in a sharp rectangular shape, it is possible to avoid a situation in which a gap is formed between the first recess 22 and the finger or the finger touches an edge portion and the user feels pain.

Second Recess 23

Further, in the grip part 20, a second recess 23 having a curved surface shape is formed between the trigger supporting member 16 and the gripping projection piece 21. With such a configuration, the user can support the trigger supporting member 16 with the upper surface of a finger by placing the finger in the second recess 23. A member that partially supports the optical information reading device 100 to receive the load of the optical information reading device 100 other than the grasping force for gripping the grip part 20 is added to improve the stability of the holding. Since the second recess 23 is formed in the curved surface shape, the second recess 23 easily fits on the outer periphery of the finger when the finger is placed in the second recess 23 as explained above. A holding feeling is improved.

On the other hand, in the plan view of the display surface 12, the second recess 23 is disposed further on the first end edge side than the first recess 22 in the longitudinal direction of the display surface 12. With such disposition, the optical information reading device 100 extended in the longitudinal direction is supported by the fingers of the user in different positions in the longitudinal direction and the load on the optical information reading device 100 is dispersed in a well-balanced state and, at the same time, since the positions of the supporting fingers are different, fulcrums and points of application of force are separated in the longitudinal direction. Not only a gripping operation of the grip part 20 but also operability of holding the grip part 20 and changing the posture of the optical information reading device 100 and rotating and moving the optical information reading device 100 is improved.

Third Recess 24

In the optical information reading device 100 shown in FIG. 5 and the like, a third recess 24 is formed on the lower surface of the display module 11 and in the front of the trigger switch 30. With such a configuration, when a finger such as the index finger placed on the trigger switch 30 is located in the third recess 24, the display module 11 can be directly supported from the lower surface side by the upper surface of the finger. The optical information reading device 100 is supported in three places including the second recess 23 and the first recess 22 to further disperse the load on the optical information reading device 100 and reduce a load for holding the optical information reading device 100. The stability of the holding is further improved.

In the plan view of the display surface 12, the third recess 24 is disposed further on the first end edge side than the second recess 23 in the longitudinal direction of the display surface 12. With such disposition, the optical information reading device 100 is supported by the fingers of the user in the three places of the first recess 22, the second recess 23, and the third recess 24 in the longitudinal direction of the optical information reading device 100 to disperse the load in a further well-balanced state. Handling during operation such as a posture change, rotation, and movement of the grip part 20 and the main body part 10 is improved.

Figure 10:
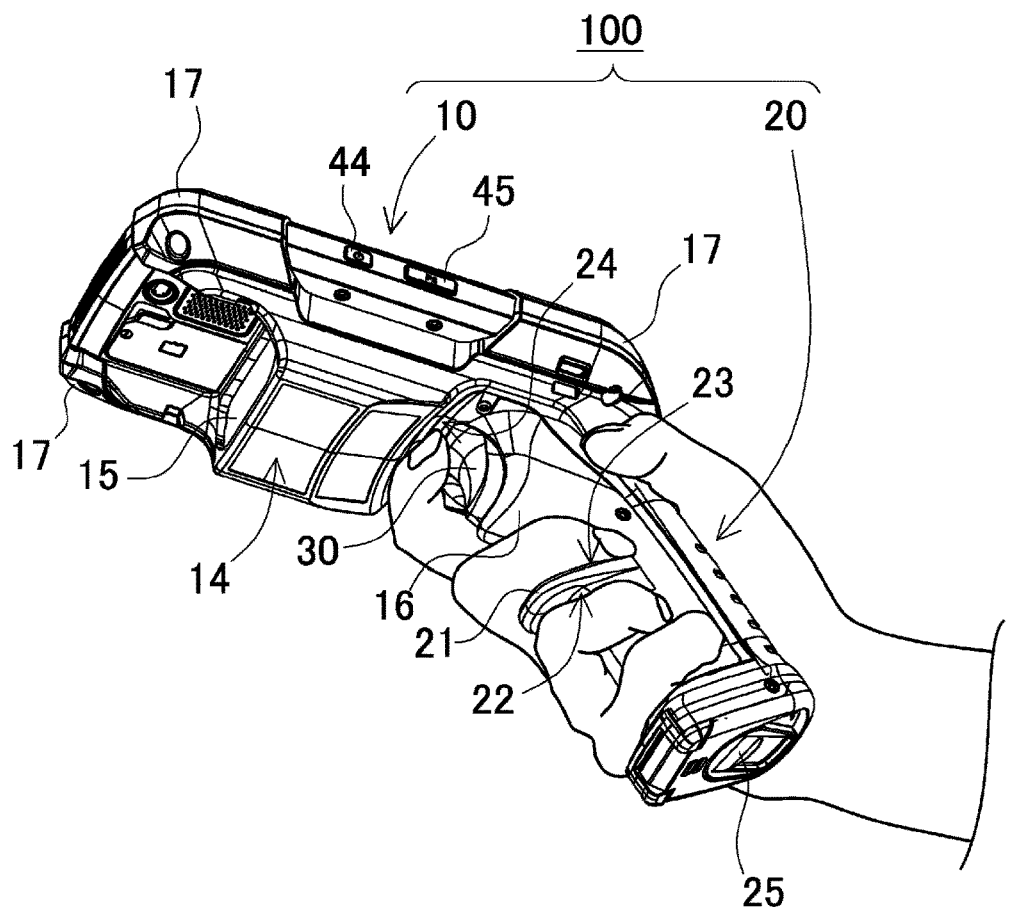
FIG. 10 is a perspective view of the optical information reading device in which a state in which an index finger is located in a third recess is viewed from obliquely below.

The third recess 24 is formed in a curved surface shape in a bottom view as shown in FIG. 10 and the like. Consequently, the third recess 24 is formed in the curved surface shape to, when the user places a finger such as the index finger on the trigger switch 30, naturally conform to the bent finger. The user can naturally support the optical information reading device 100 with a wide area of the upper surface of the finger. Since the third recess 24 is extended in an arch shape to conform to the bending of the finger, a fit feeling of the index finger and the third recess 24 is improved. When the optical information reading device 100 is physically moved, for example, the posture of the optical information reading device 100 is changed, it is possible to operate the optical information reading device 100 using the index finger. Improvement of operability is also achieved in this regard. For example, the optical information reading device 100 can be rotated around the index finger to raise the display surface. Operability on a touch surface can be improved by one hand.

In addition, the curved surface shape of the third recess 24 is preferably formed symmetrically. Consequently, irrespective of whether the user grips the optical information reading device 100 with the right hand or the left hand, the user can locate the index finger in the third recess 24 and handle the optical information reading device 100. The optical information reading device 100 can be adapted to both of a right-handed person and a left-handed person.

Battery Lid 25

The optical information reading device 100 incorporates a secondary battery 26 as a power supply for operating electronic components. The secondary battery 26 is preferably incorporated in the grip part 20. Therefore, the grip part 20 includes an openable battery lid 25 on the bottom surface of the grip part 20 as shown in FIG. 3 and the like. The battery lid 25 includes a lock lever for open and close locking. The lock lever is rotatably coupled in the plane of the bottom surface of the grip part 20. By rotating the lock lever in an unlocking direction, the battery lid 25 is unlocked and opened.

Figure 11:
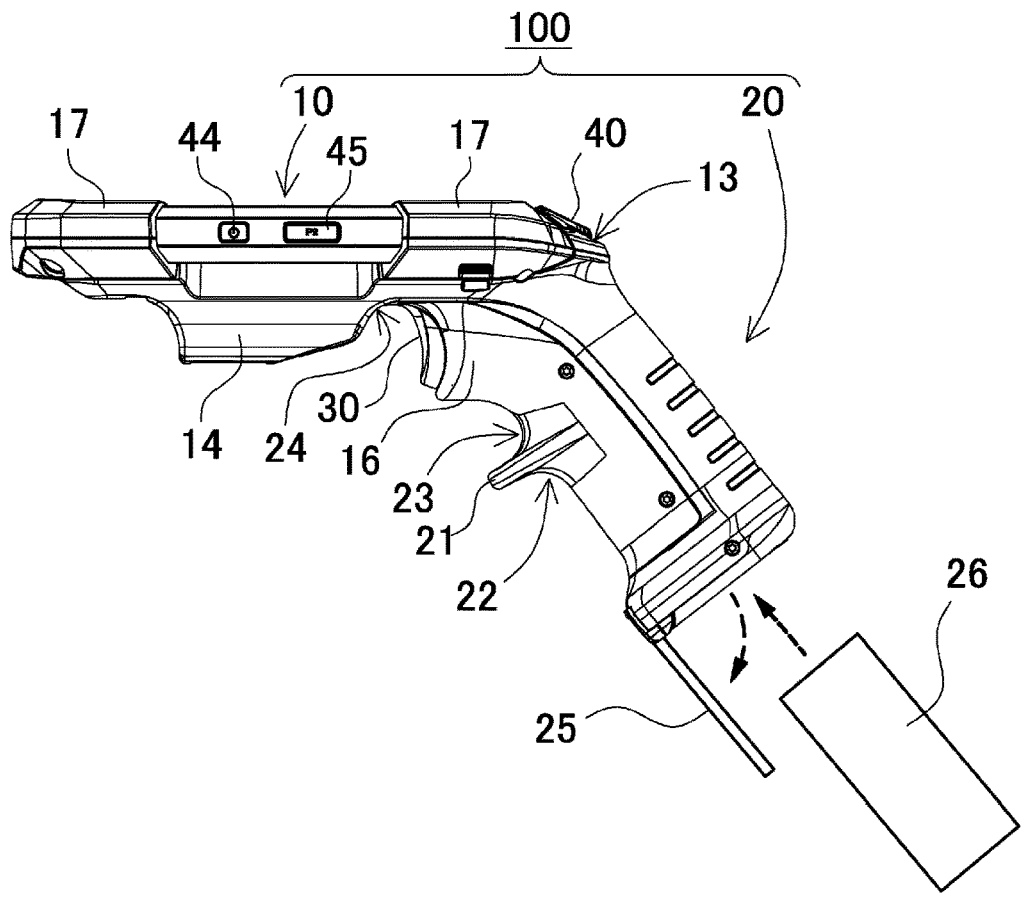
FIG. 11 is an exploded perspective view of the optical information reading device showing a state in which a secondary battery is removed.

FIG. 11 is an exploded perspective view of the optical information reading device 100 showing a state in which the battery lid 25 is opened and the secondary battery 26 is removed from the grip part 20. As shown in FIG. 11, a hinge is provided on the near side of the grip part 20. The battery lid 25 opens and closes to turn toward the first end edge side. With such a configuration, it is possible to prevent the battery lid 25 from tuning in a direction in which the battery lid 25 closes with the own weight thereof in a state in which the optical information reading device 100 is held. As the secondary battery 26, a cylindrical lithium ion secondary battery (for example, a 18650 type) or the like can be suitably used.

Note that the grip part 20 may be formed integrally with the main body part 10 or may be configured by a member separate from the main body part 10.

Covering Elastic Members 17

Further, the optical information reading device 100 can include covering elastic members 17 having elasticity. The covering elastic members 17 cover at least corner portions that are in contact therewith during a placement as shown in FIG. 1 and the like. Consequently, even when the optical information reading device 100 is suddenly dropped, it is possible to protect the optical information reading device 100 by absorbing a shock of the drop with the covering elastic members 17 provided at the corner portions.

Modifications

Figure 12:
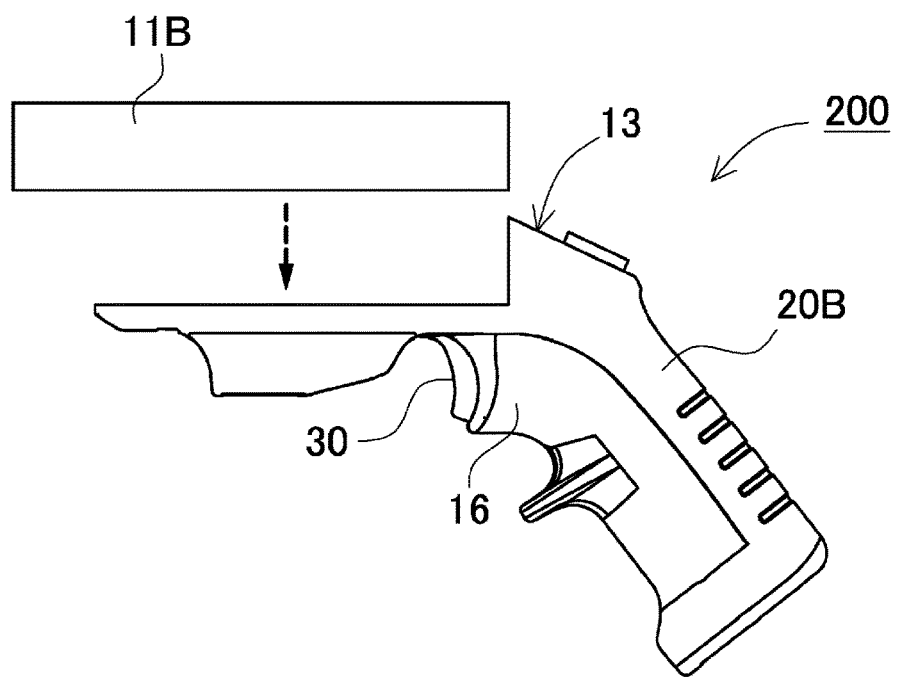
FIG. 12 is a schematic exploded side view showing an optical information reading device according to a modification.
Figure 13:
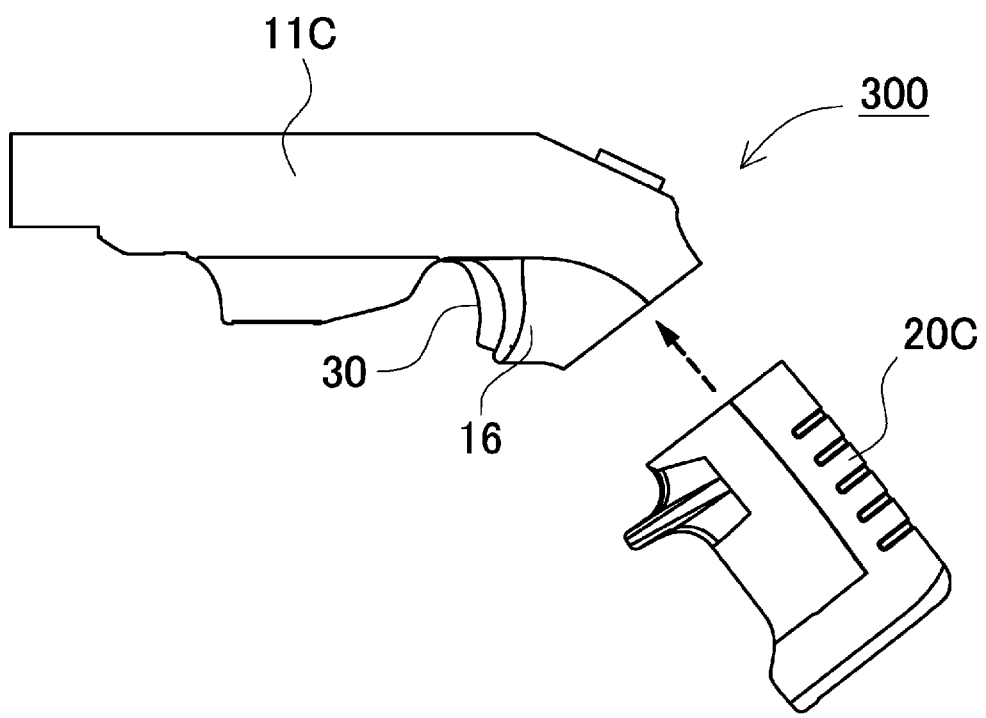
FIG. 13 is a schematic exploded side view showing an optical information reading device according to another modification.

In the example explained above, the inclined surface 13 and the imaging module 50 are provided on the display module 11 side and the trigger switch 30 and the trigger supporting member 16 are provided on the grip part 20 side. However, the present invention does not limit sides where the members are provided to these combinations. Layout and disposition sides of the members can be changed as appropriate. For example, as in an optical information reading device 200 according to a modification shown in FIG. 12, the inclined surface 13 and the imaging module 50 are not always limited to a configuration in which the inclined surface 13 and the imaging module 50 are provided on a display module 11B side. The inclined surface 13 and the imaging module 50 may be provided on a grip part 20B side. Alternatively, as in an optical information reading device 300 according to a modification shown in FIG. 13, the trigger switch 30 and the trigger supporting member 16 do not need to be always provided on a grip part 20C side and may be provided on a display module 11C side. Even in such disposition examples, the functions of the present invention explained above are also exerted.

Block Diagram

Figure 14:
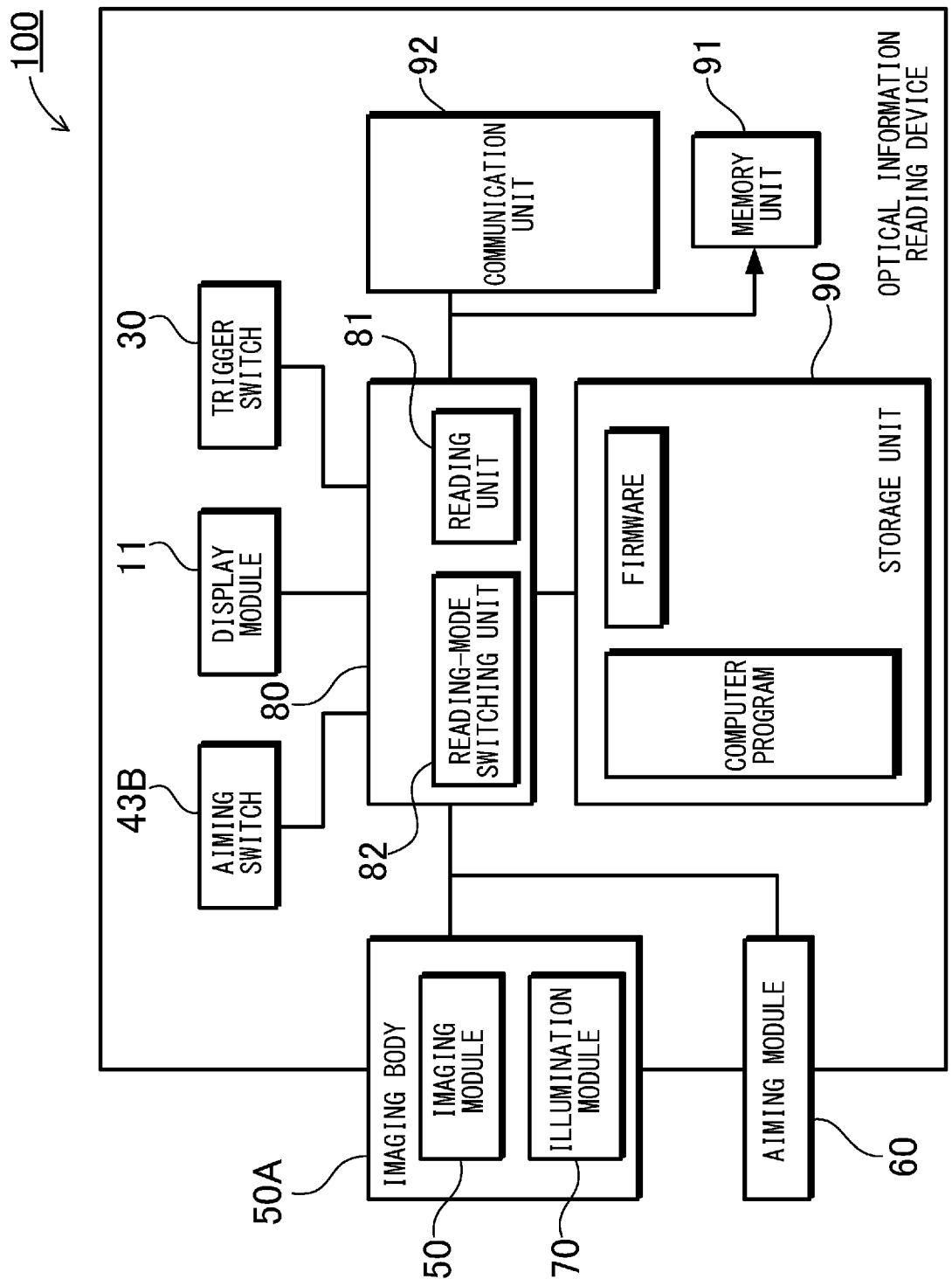
FIG. 14 is a functional block diagram of the optical information reading device.

The configuration of the optical information reading device 100 is explained with reference to a block diagram of FIG. 14. The optical information reading device 100 shown in FIG. 14 includes an imaging body 50A, the aiming module 60, the aiming switch 43B, the display module 11, the trigger switch 30, a calculation unit 80, a storage unit 90, a memory unit 91, and a communication unit 92. In an example shown in FIG. 14, the imaging module 50 and the illumination module 70 are included in the imaging body 50A. The optical information reading device 100 is not limited to this configuration. For example, the aiming module 60 may be included in the imaging body 50A.

The calculation unit 80 realizes the function of the reading unit 81. The reading unit 81 reads information of a symbol based on image data generated by imaging processing of the imaging module 50. The calculation unit 80 is configured by a CPU, an MPU, or the like. The calculation unit 80 may include a DSP. In an example shown in FIG. 14, the reading unit 81 is configured by a DSP.

The storage unit 90 is a member for retaining image data and various kinds of information such as setting information. For example, the storage unit 90 retains image data captured by the imaging module 50, a computer program, firmware, and the like. The storage unit 90 can be configured by a nonvolatile memory such as a ROM.

The memory unit 91 is a work area for loading the computer program or the like from the storage unit 90 and executing the computer program or the like. The memory unit 91 is configured by a RAM or the like.

The communication unit 92 is an interface for performing communication with an external device.

The imaging module 50 is a member that performs imaging and includes an imaging element such as a C-MOS or a CCD.

The illumination module 70 is a member that irradiates illumination light. The illumination module 70 includes a light source such as an LED.

The aiming module 60 is a member for irradiating aiming light. The aiming light serves as an indicator for indicating to the user where a reading range is located.

The aiming switch 43B is a switch for irradiating aiming light from the aiming module 60. When the user turns on the aiming switch 43B, the aiming light is irradiated from the aiming module 60.

The reading unit 81 extracts a symbol from image data captured by the imaging element and decodes and reads information encoded in the symbol. The calculation unit 80 outputs, via the communication unit 92, the information decoded by the reading unit 81. The calculation unit 80 causes the display module 11 to display the information according to necessity.

Aiming Light

When the optical information reading device 100 is directed to a symbol, it is sometimes difficult for the user to grasp which area is actually read. For example, when the symbol and the optical information reading device 100 are separated several ten meters, it is sometimes difficult to determine whether the optical information reading device 100 is set in a posture in which the optical information reading device 100 can read the symbol desired to be read. In such a case, it is conceivable to indicate an area to be imaged to the user by irradiating aiming light prior to the reading.

Change of Imaging Setting

Figure 15:
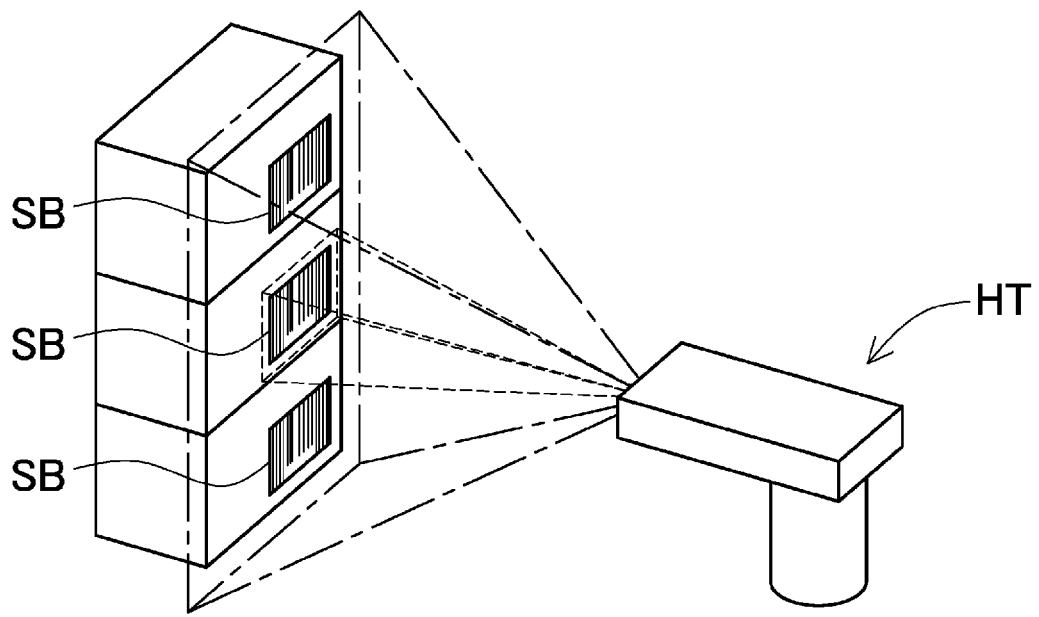
FIG. 15 is a schematic diagram showing a state in which reading performed when a plurality of symbols are close to one another.

Further, it is assumed that, in a situation in which the plurality of symbols are closely gathered in close places, for example, the cardboard boxes attached with the symbols SB are stacked as shown in FIG. 15, the user desires to read only information corresponding to a specific symbol with the optical information reading device HT. In this case, even if a direction of imaging is decided by aiming light, in some case, a plurality of symbols are captured in captured in image data and it is unclear whether a desired symbol is correctly read. In order to avoid such a problem, it is conceivable to change imaging setting to narrow an imaging visual field in advance.

Figure 16:
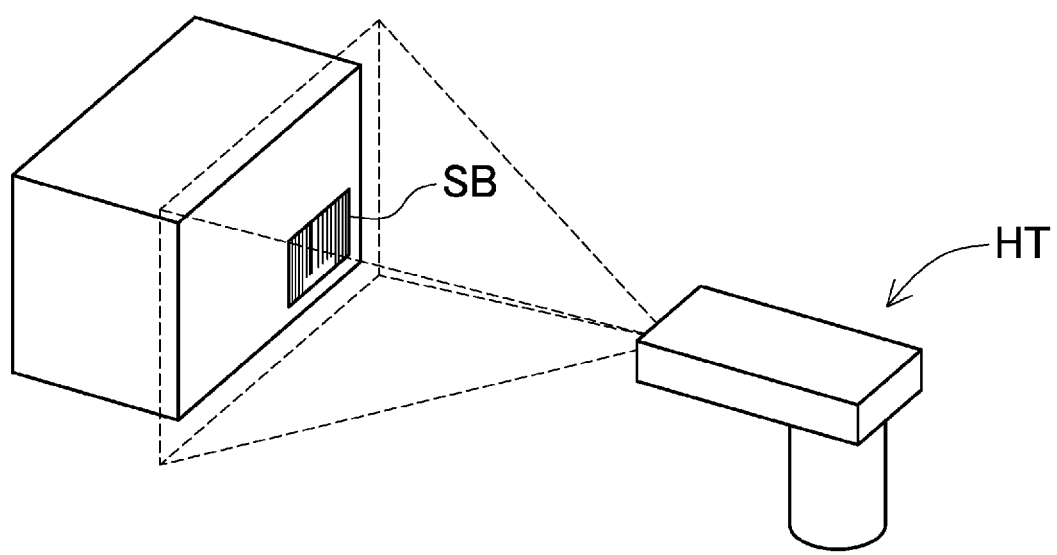
FIG. 16 is a schematic diagram showing a state in which reading of one symbol is performed.

However, when the imaging visual field is set narrow in this way, even in a state in which only one symbol SB is present as shown in FIG. 16, the posture of the optical information reading device HT has to be accurately adjusted to target the symbol SB every time. Therefore, convenience of use is deteriorated. The optical information reading device HT originally having a wide imaging visual field is capable of imaging a wide range without forcing the user to perform a behavior for targeting a symbol and decoding the symbol. Therefore, it is necessary to change the imaging setting again to widen a reading range, in other words, return the imaging visual field to the original wide imaging visual field. However, whereas work for changing such imaging setting needs to be performed from a setting screen of the optical information reading device HT, if work for switching setting is frequently necessary, the work is extremely complicated and time-consuming.

Center Reading Mode

Therefore, in this embodiment, an environment in which a reading range can be easily switched to a wide area and a narrow area without switching such image setting is provided to improve convenience for the user. That is, the reading unit 81 includes a center reading mode. Specifically, in an aiming state in which irradiation processing for aiming light by the aiming module 60 is executed by the operation of the aiming switch 43B, the reading unit 81 detects that the trigger switch 30 is operated and makes it possible to read, based on image data generated by the imaging processing of the imaging module 50, information of a symbol included in a predetermined partial area PA corresponding to an irradiation position of the aiming light. Consequently, when it is desired to read a specific symbol, the reading can be executed by associating the irradiation position of the aiming light with a specific symbol in the aiming state. It is possible to make it unnecessary to perform work for switching an imaging visual field from the wide visual field to the narrow visual field in advance and work for returning the narrow visual field to the original wide visual field after reading the specific symbol as in the past. Therefore, it is possible to improve convenience of use.

Partial Area PA

Figure 18:
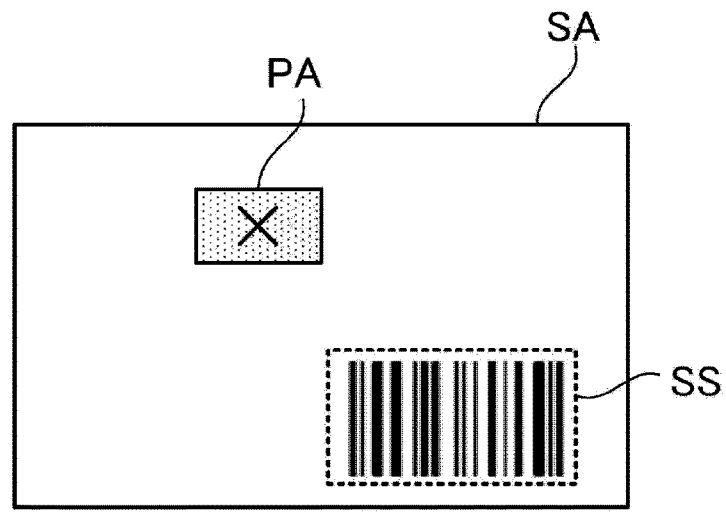
FIG. 18 is a schematic diagram showing a state in which an aiming position deviates from a symbol in a regular normal reading mode.

The partial area PA can be specified by the irradiation position of the aiming light. For example, as shown in FIG. 18 and the like, a rectangular area centering on the irradiation position of the aiming light is represented as partial area PA. The partial area PA may be formed in a square shape, a circular shape, or an elliptical shape. Alternatively, the partial area is not always specified centering on the irradiation position of the aiming light and only has to be able to be specified based on the irradiation position of the aiming light. For example, when the partial area is formed in a rectangular shape, the partial area may be specified such that the left corner portion of the rectangular shape is the irradiation position of the aiming light.

Symbol Search Area SA

Reading Mode

The optical information reading device 100 may include a plurality of reading modes and switch the plurality of reading modes. Examples of the switchable reading modes include a regular center reading mode, a regular normal reading mode, and a selective center reading mode.

The regular center reading mode is a reading mode for, in both of the aiming state and the non-aiming state, detecting that the trigger switch 30 is operated and reading information of a symbol included in the predetermined partial area PA corresponding to an irradiation position of aiming light.

The regular normal reading mode is a reading mode for, in both of the aiming state and the non-aiming state, detecting that the trigger switch 30 is operated and reading information of a symbol included in an entire area corresponding to an entire imaging visual field of the imaging module 50.

The selective center reading mode is a reading mode for changing a reading operation in the aiming state and the non-aiming state. In the aiming state, the operation of the trigger switch 30 is detected and information of a symbol included in the predetermined partial area PA corresponding to the irradiation position of the aiming light is read. On the other hand, in the non-aiming state, the operation of the trigger switch 30 is detected and information of a symbol included in the entire area corresponding to the entire imaging visual field of the imaging module 50 is read.

Reading-Mode Switching Unit 82

In this way, besides the selective center reading mode, it is possible to switch the regular center reading mode and the regular normal reading mode according to a use. A reading-mode switching unit 82 can be used for the switching of the reading modes. The reading-mode switching unit 82 can be realized as a function of the calculation unit 80 as shown in FIG. 14. For example, the calculation unit 80 generates a GUI for reading mode switching and causes the display module 11 to display the GUI for reading mode switching.

Alternatively, besides selecting a plurality of reading modes, ON and OFF of a function of a center reading mode in which a reading range for a symbol is narrowed may be switched. Note that, in this example, the expression "center reading mode" is used as a reading mode for performing reading of the partial area PA centering on the aiming position. However, as explained above, the aiming position does not always need to be the center of the partial area.

Figure 17:
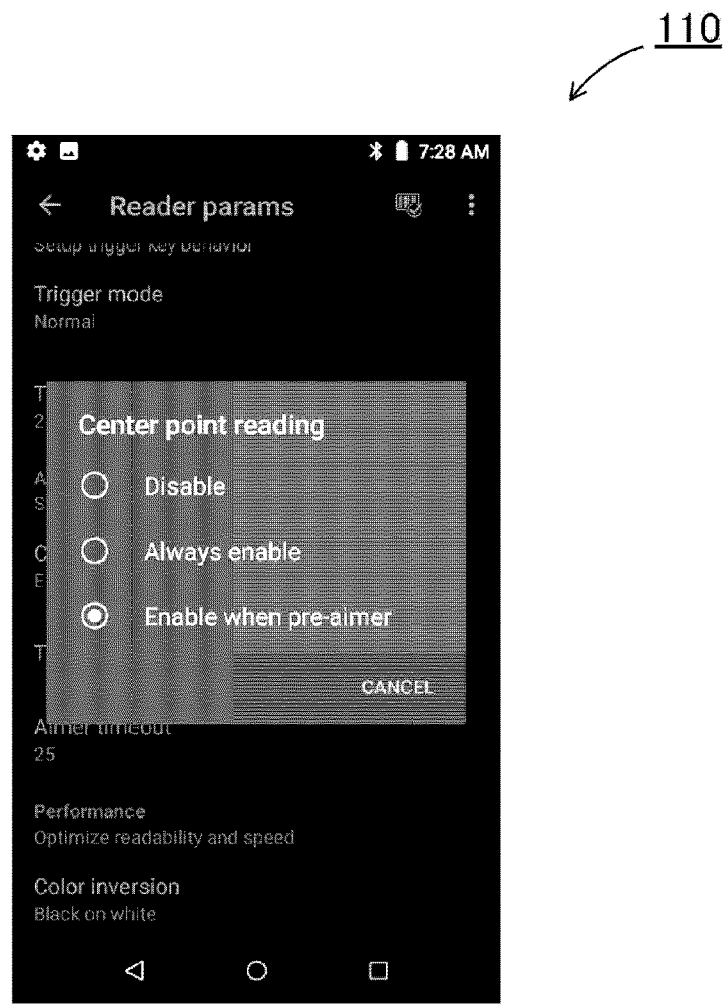
FIG. 17 is an image diagram showing a GUI for reading mode switching.

An example of the GUI for reading mode switching is shown in an image diagram of FIG. 17. In a GUI for reading mode switching 110 shown in FIG. 17, any one of "disable", "always enable", and "enable when pre-aimer" of the function of the center reading mode can be selected by a radio button. When the "disable" is selected, the regular normal reading mode is selected. When the "always enable" is selected, the regular center reading mode is selected. When the "enable when pre-aimer" is selected, the selective center reading mode is selected.

Reading Operation for Each of the Reading Modes

Reading operations in the reading modes are explained with reference to relations between the aiming position and the position of a symbol shown in FIGS. 18 to 21 and flowcharts of FIGS. 22 to 24. In these figures, in the imaging visual field, the aiming position is represented by X, the partial area PA centering on the aiming position is represented by a hatched rectangular area, a symbol search area SA for searching for a reading target symbol is represented by a solid line rectangular area, and a symbol SS to which a code result obtained by decoding the symbol is output is indicated by a broken line rectangular area.

Reading Operation in the Regular Normal Reading Mode

Figure 19:
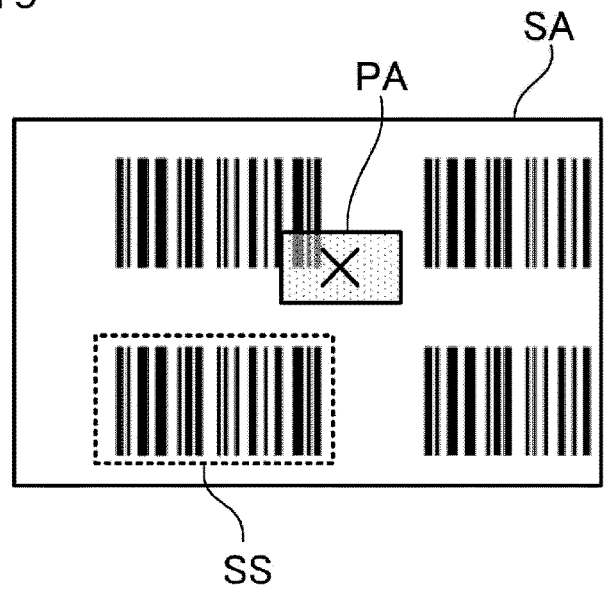
FIG. 19 is a schematic diagram showing a state in which the aiming position overlaps the symbol in the regular normal reading mode.

First, the reading operation in the regular normal reading mode is explained with reference to FIGS. 18 and 19. The center reading mode is always disabled in the regular normal reading mode. In this case, a symbol present in the imaging visual field is read and output irrespective of the aiming position. For example, even if the aiming position deviates from the symbol as shown in FIG. 18, the symbol SS present in the imaging visual field is decoded and output. When a plurality of symbols are included in the imaging visual field as shown in FIG. 19, the symbol SS successfully decoded first in the imaging visual field is output irrespective of the aiming position. In an example shown in FIG. 19, since a symbol is searched based on the lower left of the imaging visual field, a symbol in the lower left is decoded. In the regular normal reading mode, presence or absence of the aiming operation itself is not considered. That is, in the non-aiming state, for example, even when the aiming position is absent in FIGS. 18 and 19, if a readable symbol is included in the imaging visual field, the reading operation is executed and a symbol successfully read first is decoded and output.

A procedure of the reading operation in the regular normal reading mode explained above is explained with reference to a flowchart of FIG. 22. First, in step S2201, trigger start operation is performed. The user pulls the trigger switch 30 in a posture in which the optical information reading device 100 is directed to a symbol. Subsequently, in step S2202, aiming light is irradiated according to necessity. The user presses the aiming switch 43B. In step S2203, imaging processing is performed. The imaging module 50 executes generation processing for image data. In step S2204, reading processing for the symbol is executed. The reading unit 81 such as a DSP decodes information of the symbol in the image data. In step S2205, a reading result of the symbol is determined. As the determination, for example, the calculation unit 80 and the reading unit 81 determines, for example, whether the reading processing in step S2204 is successful and symbol information is successfully acquired, whether the symbol is successfully retrieved out of the image data, and whether the retrieved symbol is a desired symbol. Alternatively, the calculation unit 80 and the reading unit 81 may cause the display module 11 to display the decoded symbol and cause the user to visually determine whether the symbol is the desired symbol. If a result of the reading is failure, the procedure returns to step S2202 and the processing is performed again. On the other hand, if the result of the reading is success, the procedure proceeds to step S2206 and the decoded information is output as the result of the reading. The calculation unit 80 outputs the symbol information generated in the reading processing in step S2204 via a communication interface or the like.

(Reading Operation in the Regular Center Reading Mode)

Figure 20:
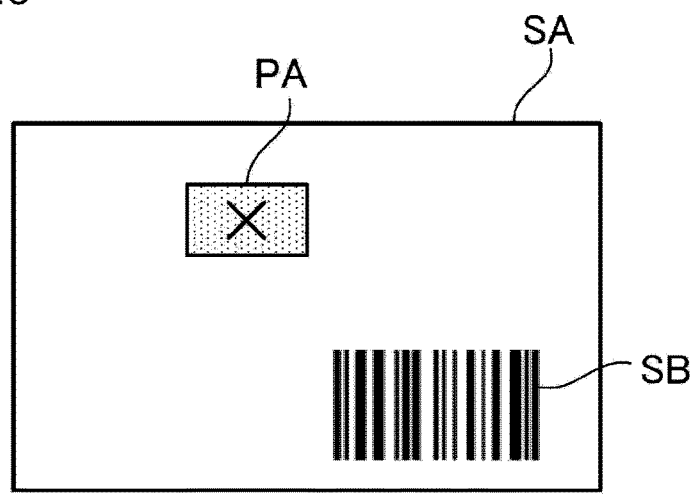
FIG. 20 is a schematic diagram showing a state in which the aiming position deviates from the symbol in a center reading mode.
Figure 21:
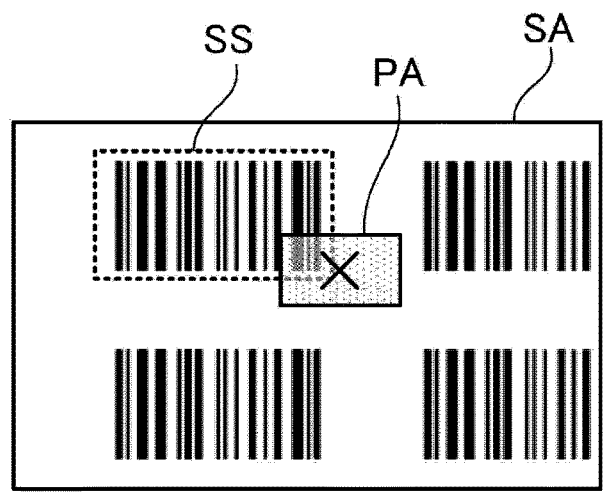
FIG. 21 is a schematic diagram showing a state in which the aiming position overlaps the symbol in the center reading mode.

The reading operation in the regular center reading mode is explained with reference to FIGS. 20 and 21. In the regular center reading mode, the center reading mode is always enabled. In this case, the partial area PA based on the aiming position and the position of a symbol are compared. When the symbol does not overlap the partial area PA, the reading operation is not performed. For example, when the aiming position deviates from the symbol SB and the partial area PA does not overlap the symbol SB as shown in FIG. 20, the reading operation is not performed. On the other hand, if a symbol overlapping the partial area PA is present, the symbol is read and decoded and a result of the decoding is output. For example, when a plurality of symbols are present in the imaging visual field as shown in FIG. 21, the user is capable of selectively reading only the symbol SS overlapping the partial area PA by irradiating aiming light on a symbol that the user desires to read. Reading may be set to be performed not only when the partial area PA overlaps a symbol but also, for example, when the distance between the aiming position and the symbol is within a predetermined range. Note that, when the partial area PA overlaps (or is near) a plurality of symbols, a symbol successfully decoded first is output. This regular center reading mode is based on the premise that the aiming operation is performed. Accordingly, for example, when the trigger switch is operated, the aiming light may be automatically irradiated even if the aiming switch is not operated.

A procedure of the reading operation in the regular center reading mode explained above is explained with reference to a flowchart of FIG. 23. Operations in steps S2301 to S2305 are the same as the operations in FIG. 22 explained above. That is, in step S2301, the trigger start operation is performed. Subsequently, in step S2302, aiming light is irradiated. In step S2303, the imaging processing is performed. In step S2304, the reading processing for a symbol is executed. Further, in step S2305, a result of the reading of the symbol is determined. If the result of the reading is failure, the procedure returns to step S2302 and the imaging is performed again. On the other hand, if the result of the reading is success, the procedure proceeds to step S2306.

In step S2306, the position of the read symbol and the partial area PA of the aiming light are compared. If the position of the symbol does not overlap the partial area PA, the procedure returns to step S2304 and the reading processing is performed again. On the other hand, if the position of the symbol overlaps the partial area PA, the procedure proceeds to step S2307. Decoded information of the relevant symbol is output as the result of the reading.

An example of the processing in step S2306 is explained in detail. For example, the calculation unit 80 determines whether position information in the image data of the symbol decoded by the reading processing overlaps the predetermined partial area PA centering on the aiming position in the image data stored in the storage unit 90 in advance. If the partial area PA and an area of the symbol overlap, the calculation unit 80 determines that the symbol is near the aiming light. On the other hand, if the partial area PA and the symbol area do not overlap, the calculation unit 80 determines that the symbol is not near the aiming light. The symbol determined as being near the aiming light is output through step S2307. On the other hand, when the calculation unit 80 does not determine that the symbol is near the aiming light, the imaging processing is executed again. Note that the irradiation position of the aiming light is calibrated in advance and retained in the storage unit 90. The predetermined area PA centering on the aiming position is set based on a calibration error or read code information.

Reading Operation in the Selective Center Reading Mode

The reading operation in the selective center reading mode changes according to presence or absence of the aiming operation. That is, in the non-aiming state in which the aiming operation is not performed, the selective center reading mode changes to the normal reading mode. The same reading operation as the reading operation in the regular normal reading mode explained with reference to FIGS. 18 and 19 is performed. In the aiming state in which the user performs the aiming operation and the aiming light is irradiated, the selective center reading mode changes to the center reading mode. The same reading operation as the reading operation in the regular center reading mode explained with reference to FIGS. 20 and 21 is performed.

A procedure of the reading operation in the selective center reading mode explained above is explained with reference to a flowchart of FIG. 24. First, in step S2401, irradiation operation for aiming light is performed. The user presses the aiming switch 43B. Subsequently, in step S2402, the aiming light is irradiated. In response to the operation of the aiming switch 43B, the aiming module 60 performs irradiation processing for the aiming light. The aiming module 60 scans the aiming light at high speed and displays a pattern with a track of the aiming light. Accordingly, the aiming module 60 continuously executes the irradiation processing for the aiming light. Subsequently, in step S2403, trigger start operation is performed. The user presses the trigger switch 30.

Subsequently, in step S2404, it is determined whether the optical information reading device 100 is in the aiming state. The CPU of the calculation unit 80 determines whether the irradiation operation for the aiming light is performed by the aiming module 60 before the trigger start operation. If operation for irradiating the aiming light is not performed during the trigger start operation, for example, the aiming light irradiation in step S2402 is stopped before the trigger start operation in step S2403, it is determined that the optical information reading device 100 is in the non-aiming state. The procedure proceeds to step S2405. On the other hand, if the operation for irradiating the aiming light is performed during the trigger start operation, for example, the aiming light irradiation in step S2402 is performed at a point in time of the trigger start operation in step S2403, it is determined that the optical information reading device 100 is in the aiming state. The procedure proceeds to step S2410.

Figure 22:
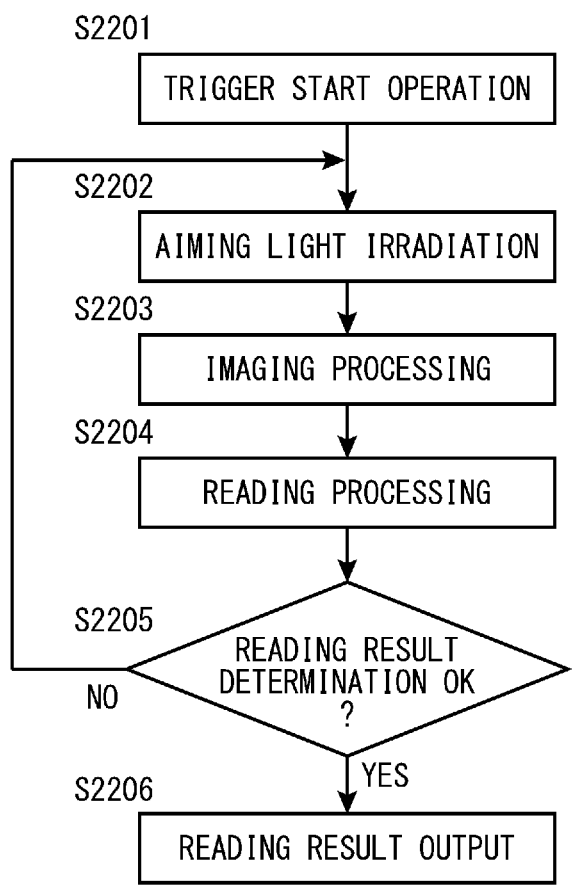
FIG. 22 is a flowchart showing a procedure of a reading operation in the regular normal reading mode.

Operations in steps S2405 to S2409 performed when it is determined that the optical information reading device 100 is in the non-aiming state are the same as the operations in steps S2202 to S2206 in FIG. 22 explained above. That is, in step S2405, the aiming light is irradiated according to necessity (the aiming light may not be irradiated). In step S2406, the imaging processing is performed. In step S2407, the reading processing for a symbol is performed. In step S2408, a result of the reading of the symbol is determined. If the result of the reading is failure, the procedure returns to step S2405 and the processing is performed again. On the other hand, if the result of the reading is success, the procedure proceeds to step S2409. The decoded information is output as the result of the reading.

Figure 23:
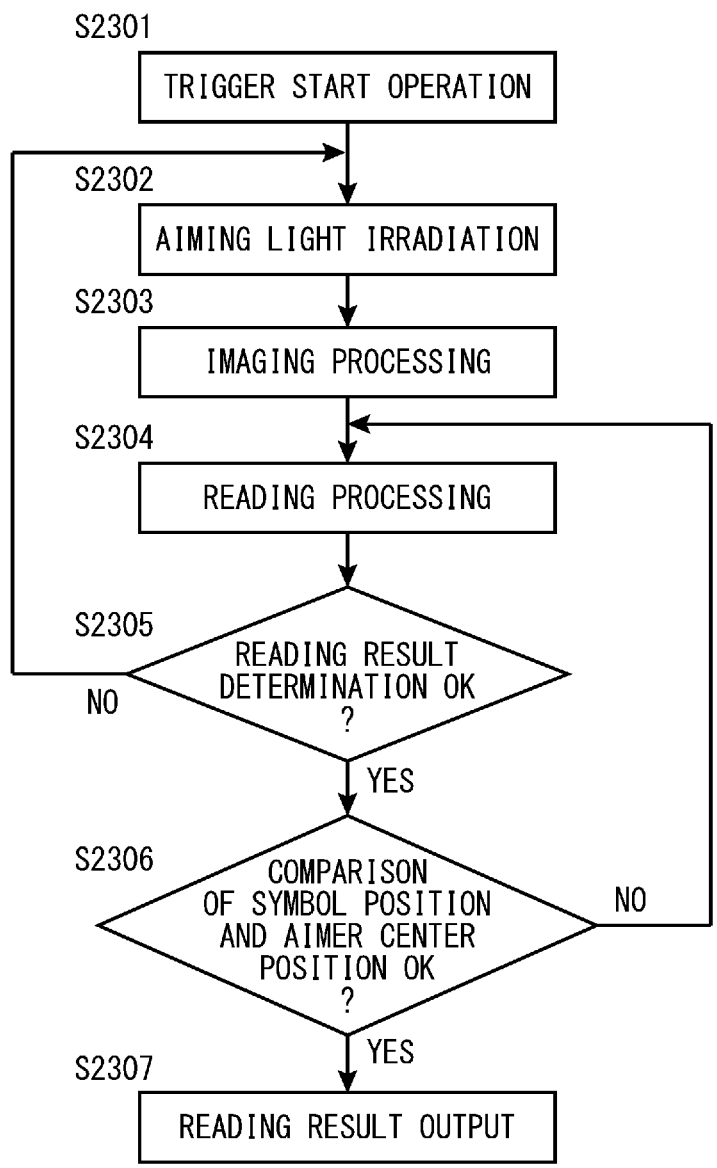
FIG. 23 is a flowchart showing a procedure of a reading operation in the regular center reading mode.
Figure 24:
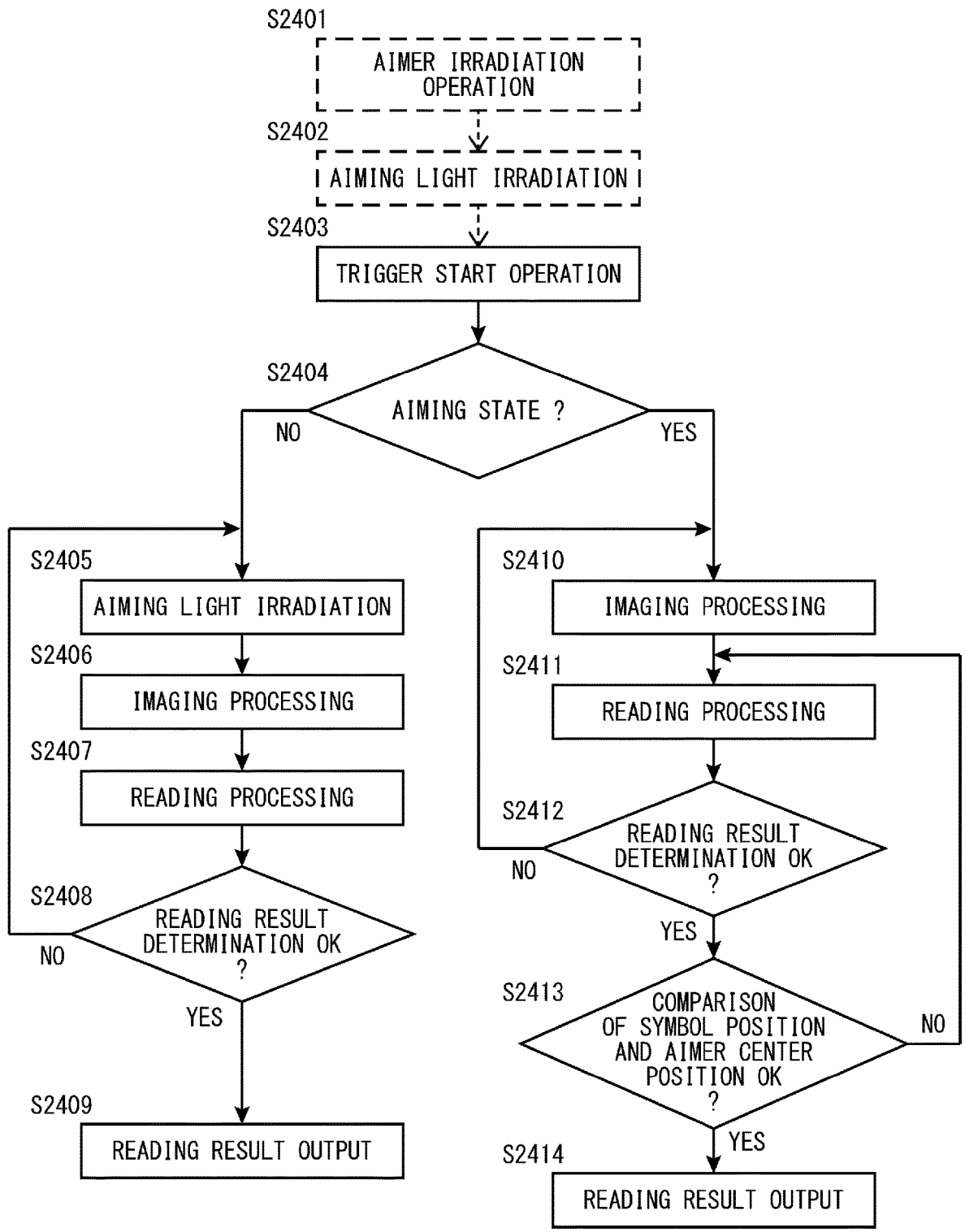
FIG. 24 is a flowchart showing a procedure of a reading operation in a selective center reading mode.

On the other hand, operations in steps S2410 to S2414 performed when it is determined in step S2404 that the optical information reading device 100 is in the aiming state are the same as the operations in steps S2303 to S2307 in FIG. 23 explained above. That is, in step S2410, the imaging processing is performed. In step S2411, the reading processing for a symbol is performed. Further, in step S2412, a result of the reading is determined. If the result of the reading is failure, the procedure returns to step S2410 and the processing is performed again. On the other hand, if the result of the reading is success, the procedure proceeds to step S2413. In step S2413, the position of the read symbol and the partial area PA of the aiming light are compared. If the position of the symbol does not overlap the partial area PA, the procedure returns to step S2411 and the search is performed again. On the other hand, if the position of the symbol overlaps the partial area PA, the procedure proceeds to step S2414. The relevant symbol is decoded and the result of the reading is output.

In the selective center reading mode, the reading operation is changed according to presence or absence of the aiming operation. Accordingly, the operation of the aiming switch 43B needs to be detected. As explained above, the function of the aiming switch 43B is allocated to the first function key 43 shown in FIG. 1 and the like (in FIG. 1 and the like, the left of the cross key 41). In this way, the allocation of the aiming switch 43B is executed when the selective center reading mode is selected and the allocation of the aiming switch 43B is disabled when the selective center reading mode is not selected. Consequently, it is possible to eliminate necessity of providing the exclusive aiming switch 43B, reduce the number of physical key switches, and simplify the configuration of the optical information reading device 100.

Further, in the example explained above, a behavior for starting reading execution for a symbol is allocated to the trigger switch 30 and a behavior for starting irradiation of aiming light is allocated to the aiming switch 43B. However, the present invention is not limited to this configuration. A plurality of behaviors may be allocated to the trigger switch 30. For example, the trigger switch 30 may be set such that the aiming light is irradiated while the user presses the trigger switch 30 and the reading is started when the user releases the trigger switch 30. Alternatively, the trigger switch 30 may be set such that the aiming light is irradiated when the user presses the trigger switch 30 for a short time and the reading is started when the user presses the trigger switch 30 for a long time or double-clicks the trigger switch 30. The same operation may be allocated to the aiming switch 43B. For example, the aiming switch 43B is set such that the aiming light is irradiated when the aiming switch 43B is turned on and the reading operation is started when the aiming switch 43B is turned off. In this way, the user can instruct the irradiation of the aiming light and the reading operation with one switch without operating two switches such as the trigger switch 30 and the aiming switch 43B. Therefore, it is possible to improve operability for the user.

In all the reading modes, the decoded symbol may be displayed on the display module 11. For example, when the decoded symbol is surrounded by a frame and displayed on the display surface in the form shown in FIG. 21, the user can visually recognize that reading of a desired symbol is correctly performed. When the aiming position and the partial area PA are displayed together with the symbol, even if an unintended symbol is read, it is easy to correct a reading position of the optical information reading device 100 according to a positional relation between the aiming position and the symbol.

In the example explained above, the reading target symbol is selected based on the aiming position in the imaging visual field. In other words, the reading area is set based on the aiming position in the imaging visual field. However, the present invention is not limited to this configuration. The imaging visual field itself imaged by the imaging element may be limited. That is, a wide area is imaged in a normal case. In a specific case, for example, when a large number of symbols are adjacent to one another, the imaging visual field is set to be narrowed and imaged. Consequently, it is possible to obtain the same result as the result obtained when a symbol to be imaged is limited and the reading area is narrowed. In this case, there is also an advantage that processing required for imaging can be simplified by narrowing an imaging range.

Similarly, the reading unit 81 can also limit the symbol search area SA where a symbol in a target area is searched. For example, the size of the partial area PA can be switched by setting or the like. Examples of the setting include a level (low, medium, high, and the like) of sensitivity, a reading distance, and a code size.

The optical information reading device and the optical information reading method of the present invention are used in a warehouse, a factory, a store, a hospital, and the like. The optical information reading device and the optical information reading method of the present invention can be suitably used for a handy scanner, a handy terminal, a PDA for business use, and the like that read a symbol such as a barcode or a two-dimensional code and perform registration and collation of data.

What is claimed is:

1. An optical information reading device comprising:
    an imaging module configured to convert reflected light from a reading target symbol into an electric signal and generate image data;
    an aiming module configured to irradiate aiming light for instructing an imaging area of the image data generated by the imaging module;
    a trigger switch for starting imaging processing by the imaging module;
    an aiming switch for causing the aiming module to irradiate the aiming light; and
    a reading unit configured to read information of the symbol based on the image data generated by the imaging processing of the imaging module, wherein
    the reading unit is configured to
    determine whether the optical information reading device is in an aiming state in which irradiation processing for the aiming light by the aiming module is executed by operation of the aiming switch at a point in time when the trigger switch is operated, and read, based on the image data generated by the imaging processing of the imaging module, information of the symbol included in a predetermined partial area corresponding to an irradiation position of the aiming light upon determining that the optical information reading device is in the aiming state, the predetermined partial area being narrower than an imaging field of the imaging module.

2. The optical information reading device according to claim 1, wherein the reading unit is configured to, in the aiming state, read the information of the symbol included in the predetermined partial area including the irradiation position of the aiming light.

3. The optical information reading device according to claim 1, wherein the reading unit is configured to, in the aiming state, read the information of the symbol when the irradiation position of the aiming light overlaps a part of the symbol.

4. The optical information reading device according to claim 1, wherein the reading unit is configured to determine whether the optical information reading device is in a non-aiming state in which the irradiation processing for the aiming light by the aiming module is not executed by operation of the aiming switch when the trigger switch is operated, and read, based on the image data generated by the imaging processing of the imaging module, the information of the symbol included in an entire area corresponding to an entire imaging visual field of the imaging module upon determining that the optical information reading device is in the non-aiming state.

5. The optical information reading device according to claim 1, wherein the reading unit is configured to, in the aiming state, output only the information of the symbol included in the predetermined partial area in the information of the symbol included in an entire area corresponding to an entire imaging visual field of the imaging module when the trigger switch is operated.

6. The optical information reading device according to claim 1, wherein the reading unit is configured to alternately or continuously execute the imaging processing for an entire imaging visual field imaged by the imaging module and the irradiation processing for the aiming light by the aiming module when the trigger switch is operated.

7. The optical information reading device according to claim 1, wherein the reading unit is configured to, in the aiming state, alternately or continuously execute the imaging processing for the predetermined partial area and the irradiation processing for the aiming light by the aiming module when the trigger switch is operated.

8. The optical information reading device according to claim 1, further comprising a reading-mode switching unit configured to switch a regular center reading mode for, in both of the aiming state and a non-aiming state, reading the information of the symbol included in the predetermined partial area corresponding to the irradiation position of the aiming light when the trigger switch is operated, a regular normal reading mode for, in both of the aiming state and the non-aiming state, reading the information of the symbol included in an entire area corresponding to an entire imaging visual field of the imaging module when the trigger switch is operated, and a selective center reading mode for, in the aiming state, reading the information of the symbol included in the predetermined partial area corresponding to the irradiation position of the aiming light when the trigger switch is operated and, in the non-aiming state, reading the information of the symbol included in the entire area corresponding to the entire imaging visual field of the imaging module when the trigger switch is operated.

9. The optical information reading device according to claim 1, further comprising:
a display module including a rectangular display surface extended in one direction and including, as end edges along a longitudinal direction of the display surface, a first end edge for performing imaging and a second end edge on an opposite side of the first end edge; and
a grip part ranging from an inclined surface inclined from the display surface on the second end edge side of the display module, the grip part being inclined and extended in a direction away from the display surface in the longitudinal direction of the display surface, wherein
the aiming switch is disposed on the inclined surface between the display module and the grip part.

10. The optical information reading device according to claim 1, wherein
the trigger switch and the aiming switch are configured by a common switch, and
the trigger switch is operated as the aiming switch according to a time of ON/OFF of the trigger switch.

11. An optical information reading method using an optical information reading device that images a reading target symbol by operating a trigger switch and reads the symbol, the optical information reading method comprising:
irradiating, by an aiming switch, on the reading target symbol, from an aiming module, aiming light for instructing an imaging area of image data generated by an imaging module by converting reflected light from the symbol into an electric signal;
determining whether the optical information reading device is in an aiming state in which irradiation processing for the aiming light by the aiming module is executed by operation of the aiming switch at a point in time when the trigger switch is operated; and
reading, based on the image data, information of the symbol included in a predetermined partial area corresponding to an irradiation position of the aiming light upon determining that the optical information reading device is in the aiming state, the predetermined partial area being narrower than an imaging visual field of the imaging module.

12. The optical information reading method according to claim 11, wherein, in the reading the information of the symbol, the trigger switch is operated while the aiming switch is kept operated.

13. The optical information reading method according to claim 11, wherein, in the reading the information of the symbol, in a non-aiming state in which the irradiation processing for the aiming light is not executed, the information of the symbol included in an entire area corresponding to an entire imaging visual field of the imaging module is read based on the image data generated by imaging processing of the imaging module by operating the trigger switch.

* * * * *